United States Patent
Schinagl

(10) Patent No.: US 10,288,798 B2
(45) Date of Patent: May 14, 2019

(54) ILLUMINATION DEVICE IN WHICH SOURCE LIGHT INJECTION IS NON-PARALLEL TO DEVICE'S OPTICAL AXIS

(71) Applicant: Quarkstar LLC, Las Vegas, NV (US)

(72) Inventor: Ferdinand Schinagl, North Vancouver (CA)

(73) Assignee: Quarkstar LLC, Las Vegas, NV (US)

( * ) Notice: Subject to any disclaimer, the term of this patent is extended or adjusted under 35 U.S.C. 154(b) by 19 days.

(21) Appl. No.: 15/283,101

(22) Filed: Sep. 30, 2016

(65) Prior Publication Data
US 2017/0184779 A1    Jun. 29, 2017

Related U.S. Application Data

(63) Continuation of application No. 14/417,787, filed as application No. PCT/US2014/047295 on Jul. 18, 2014, now Pat. No. 9,459,398.

(Continued)

(51) Int. Cl.
*F21S 8/04* (2006.01)
*F21V 8/00* (2006.01)
(Continued)

(52) U.S. Cl.
CPC .............. *G02B 6/0073* (2013.01); *F21S 8/04* (2013.01); *F21V 7/0016* (2013.01);
(Continued)

(58) Field of Classification Search
CPC ........ F21S 8/04; F21V 7/0016; F21V 7/0091; G02B 6/0023; G02B 6/002; G02B 6/0006;
(Continued)

(56) References Cited

U.S. PATENT DOCUMENTS 2,194,841 A    3/1940  Welch
2,626,120 A    1/1953  Baker
(Continued)

FOREIGN PATENT DOCUMENTS

CA    2 702 690    11/2010
DE    199 17 401    10/2000
(Continued)

OTHER PUBLICATIONS

European Application No. 17188348.1, European Search Report dated Dec. 8, 2017, 6 pages.
(Continued)

*Primary Examiner* — Jong-Suk (James) Lee
*Assistant Examiner* — Christopher E Dunay
(74) *Attorney, Agent, or Firm* — Fish & Richardson P.C.

(57) ABSTRACT

An illumination device includes a light source configured to emit, during operation, light with a prevalent direction of propagation different from a direction of an optical axis of the illumination device; and an optical coupler including a transparent material, the optical coupler having an input aperture, an exit aperture and a first side surface and a second side surface arranged between the input aperture and the exit aperture, the exit aperture being centered on the optical axis of the illumination device. The optical coupler receives the emitted light through the input aperture from the light source. Further, the first side surface and the second side surface redirect the received light via total internal reflection (TIR) to the exit aperture. Additionally, the redirected light is issued through the exit aperture.

20 Claims, 13 Drawing Sheets

Related U.S. Application Data

(60) Provisional application No. 61/856,009, filed on Jul. 18, 2013.

(51) Int. Cl.

| | |
|---|---|
| *F21V 7/00* | (2006.01) |
| *F21Y 103/10* | (2016.01) |
| *F21Y 115/10* | (2016.01) |
| *F21Y 101/00* | (2016.01) |

(52) U.S. Cl.
 CPC ............ *F21V 7/0091* (2013.01); *G02B 6/002* (2013.01); *G02B 6/0006* (2013.01); *G02B 6/0008* (2013.01); *G02B 6/0023* (2013.01); *G02B 6/0031* (2013.01); *G02B 6/0035* (2013.01); *G02B 6/0036* (2013.01); *G02B 6/0045* (2013.01); *G02B 6/0051* (2013.01); *G02B 6/0055* (2013.01); *G02B 6/0068* (2013.01); *G02B 6/0076* (2013.01); *G02B 6/0085* (2013.01); *F21Y 2101/00* (2013.01); *F21Y 2103/10* (2016.08); *F21Y 2115/10* (2016.08)

(58) Field of Classification Search
 CPC ... G02B 6/0008; G02B 6/0035; G02B 6/0045
 See application file for complete search history.

(56) References Cited

U.S. PATENT DOCUMENTS

| | | | |
|---|---|---|---|
| 3,772,506 A | 11/1973 | Junginger | |
| 3,836,767 A | 9/1974 | Lasker | |
| 4,112,483 A | 9/1978 | Small et al. | |
| 4,240,692 A | 12/1980 | Winston | |
| 4,254,456 A | 3/1981 | Grindle et al. | |
| 4,271,408 A | 6/1981 | Teshima et al. | |
| 4,358,817 A | 11/1982 | Bielemeier | |
| 4,576,436 A | 3/1986 | Daniel | |
| 4,947,292 A * | 8/1990 | Vlah | F21V 7/04 362/346 |
| 5,075,827 A | 12/1991 | Smith | |
| 5,134,550 A | 7/1992 | Young | |
| 5,289,356 A | 2/1994 | Winston | |
| 5,436,805 A | 7/1995 | Hsu et al. | |
| 5,438,485 A * | 8/1995 | Li | B60Q 1/0011 362/558 |
| 5,581,683 A * | 12/1996 | Bertignoll | G02B 6/0003 362/558 |
| 5,754,828 A | 5/1998 | Adan | |
| 5,810,463 A * | 9/1998 | Kawahara | G02B 6/0006 250/227.2 |
| 5,868,489 A | 2/1999 | Fuller et al. | |
| 5,988,836 A | 11/1999 | Sawarens | |
| 6,058,271 A * | 5/2000 | Tenmyo | G03B 15/03 396/198 |
| 6,234,643 B1 | 5/2001 | Lichon | |
| 6,241,369 B1 | 6/2001 | Mackiewicz | |
| 6,273,577 B1 | 8/2001 | Goto et al. | |
| 6,350,041 B1 | 2/2002 | Tarsa et al. | |
| 6,441,943 B1 | 8/2002 | Roberts et al. | |
| 6,505,953 B1 | 1/2003 | Dahlen | |
| 6,527,420 B1 | 3/2003 | Chuang | |
| 6,540,373 B2 | 4/2003 | Bailey | |
| 6,543,911 B1 | 4/2003 | Rizkin et al. | |
| 6,572,246 B1 | 6/2003 | Hopp et al. | |
| 6,598,998 B2 | 7/2003 | West et al. | |
| 6,834,979 B1 | 12/2004 | Cleaver et al. | |
| 6,880,963 B2 | 4/2005 | Luig et al. | |
| 6,932,499 B2 * | 8/2005 | Ogura | H04N 1/031 358/484 |
| 7,083,315 B2 | 8/2006 | Hansler et al. | |
| 7,097,337 B2 | 8/2006 | Kim et al. | |
| 7,156,540 B2 | 1/2007 | Haines | |
| 7,164,842 B2 | 1/2007 | Chen | |
| 7,182,480 B2 | 2/2007 | Kan | |
| 7,259,403 B2 | 8/2007 | Shimizu et al. | |
| 7,275,841 B2 | 10/2007 | Kelly | |
| 7,275,849 B2 | 10/2007 | Chinniah et al. | |
| 7,286,296 B2 | 10/2007 | Chaves et al. | |
| 7,290,906 B2 | 11/2007 | Suzuki et al. | |
| 7,293,889 B2 | 11/2007 | Kamiya | |
| 7,331,691 B2 | 2/2008 | Livesay et al. | |
| 7,334,932 B2 | 2/2008 | Klettke | |
| 7,341,358 B2 | 3/2008 | Hsieh et al. | |
| 7,386,214 B1 | 6/2008 | Canciotto | |
| 7,387,399 B2 | 6/2008 | Noh et al. | |
| 7,434,951 B2 | 10/2008 | Bienick | |
| 7,530,712 B2 | 5/2009 | Lin et al. | |
| 7,645,054 B2 | 1/2010 | Goihl | |
| 7,850,347 B2 | 12/2010 | Speier et al. | |
| 7,855,815 B2 | 12/2010 | Hayashide et al. | |
| 7,942,546 B2 | 5/2011 | Naijo et al. | |
| 7,947,915 B2 | 5/2011 | Lee et al. | |
| 7,967,477 B2 | 6/2011 | Bloemen et al. | |
| 8,002,446 B1 | 8/2011 | Plunk et al. | |
| 8,006,453 B2 | 8/2011 | Anderson | |
| 8,042,968 B2 | 10/2011 | Boyer et al. | |
| 8,061,867 B2 | 11/2011 | Kim et al. | |
| 8,068,707 B1 | 11/2011 | Simon | |
| 8,075,147 B2 | 12/2011 | Chaves et al. | |
| 8,192,051 B2 | 6/2012 | Dau et al. | |
| 8,348,489 B2 | 1/2013 | Holman et al. | |
| 8,573,823 B2 | 11/2013 | Dau | |
| 8,740,407 B2 | 6/2014 | Kotovsky et al. | |
| 2003/0117798 A1 | 6/2003 | Leysath | |
| 2003/0219207 A1 * | 11/2003 | Guy | A61B 1/07 385/49 |
| 2004/0012976 A1 * | 1/2004 | Amano | F21V 7/0091 362/511 |
| 2004/0080947 A1 | 4/2004 | Subisak et al. | |
| 2004/0105264 A1 | 6/2004 | Spero | |
| 2004/0120160 A1 | 6/2004 | Natsume | |
| 2004/0137189 A1 | 7/2004 | Tellini et al. | |
| 2004/0208019 A1 | 10/2004 | Koizumi | |
| 2004/0228131 A1 | 11/2004 | Minano et al. | |
| 2004/0257803 A1 | 12/2004 | Kermoade | |
| 2005/0018147 A1 * | 1/2005 | Lee | F21V 7/0091 353/98 |
| 2005/0057922 A1 | 3/2005 | Herst et al. | |
| 2005/0063169 A1 | 3/2005 | Erber | |
| 2005/0111235 A1 | 5/2005 | Suzuki et al. | |
| 2005/0185416 A1 | 8/2005 | Lee et al. | |
| 2005/0207177 A1 | 9/2005 | Guy | |
| 2005/0243570 A1 | 11/2005 | Chaves et al. | |
| 2005/0259224 A1 | 11/2005 | Lee | |
| 2005/0265044 A1 | 12/2005 | Chen et al. | |
| 2005/0270774 A1 | 12/2005 | Pan | |
| 2006/0002131 A1 | 1/2006 | Schultz et al. | |
| 2006/0050282 A1 | 3/2006 | De Lamberterie | |
| 2006/0061990 A1 | 3/2006 | Chinniah et al. | |
| 2006/0076568 A1 | 4/2006 | Keller et al. | |
| 2006/0098444 A1 | 5/2006 | Petruzzi | |
| 2006/0139917 A1 | 6/2006 | Ward | |
| 2006/0164839 A1 | 7/2006 | Stefanov | |
| 2006/0187661 A1 | 8/2006 | Holten | |
| 2006/0193137 A1 * | 8/2006 | Chinniah | F21V 7/0091 362/326 |
| 2007/0047228 A1 | 3/2007 | Thompson et al. | |
| 2007/0061360 A1 | 3/2007 | Holcombe et al. | |
| 2007/0081360 A1 | 4/2007 | Bailey | |
| 2007/0097696 A1 | 5/2007 | Eng et al. | |
| 2007/0201234 A1 | 8/2007 | Ottermann | |
| 2007/0280593 A1 | 12/2007 | Brychell et al. | |
| 2008/0074752 A1 | 3/2008 | Chaves et al. | |
| 2008/0080166 A1 | 4/2008 | Duong et al. | |
| 2008/0170398 A1 | 7/2008 | Kim | |
| 2008/0192458 A1 | 8/2008 | Li | |
| 2008/0198603 A1 | 8/2008 | Sormani et al. | |
| 2008/0232740 A1 | 9/2008 | Meis et al. | |
| 2008/0259640 A1 | 10/2008 | Parker | |
| 2008/0273338 A1 * | 11/2008 | Stefanov | G02B 6/0001 362/310 |

(56) References Cited

U.S. PATENT DOCUMENTS

| | | |
|---|---|---|
| 2009/0103293 A1 | 4/2009 | Harbers et al. |
| 2009/0168395 A1 | 7/2009 | Mrakovich et al. |
| 2009/0201698 A1 | 8/2009 | Klick et al. |
| 2009/0231831 A1 | 9/2009 | Hsiao |
| 2009/0231878 A1 | 9/2009 | Van Duijneveldt |
| 2009/0316414 A1 | 12/2009 | Yang |
| 2010/0002443 A1 | 1/2010 | Schultheis |
| 2010/0085773 A1 | 4/2010 | Richardson |
| 2010/0220497 A1 | 9/2010 | Ngai |
| 2011/0063870 A1 | 3/2011 | Nomoto et al. |
| 2011/0103067 A1 | 5/2011 | Ago et al. |
| 2011/0164398 A1 | 7/2011 | Holten et al. |
| 2011/0175533 A1 | 7/2011 | Holman et al. |
| 2011/0182084 A1 | 7/2011 | Tomlinson |
| 2011/0199005 A1 | 8/2011 | Bretschneider et al. |
| 2011/0227487 A1 | 9/2011 | Nichol et al. |
| 2011/0234121 A1 | 9/2011 | Ding et al. |
| 2011/0235318 A1 | 9/2011 | Simon |
| 2011/0267836 A1 | 11/2011 | Boonekamp et al. |
| 2011/0273900 A1 | 11/2011 | Li et al. |
| 2011/0286200 A1 | 11/2011 | Iimura |
| 2012/0020066 A1 | 1/2012 | Chang |
| 2012/0044675 A1 | 2/2012 | Buelow et al. |
| 2012/0069595 A1 | 3/2012 | Catalano |
| 2012/0099310 A1* | 4/2012 | Kropac ............... G02B 6/0018 362/235 |
| 2012/0140481 A1* | 6/2012 | Simchak ............... F21V 7/07 362/296.07 |
| 2012/0147624 A1 | 6/2012 | Li et al. |
| 2012/0155110 A1 | 6/2012 | Pijlman et al. |
| 2012/0155116 A1 | 6/2012 | Gardner |
| 2012/0170260 A1 | 7/2012 | Gardner |
| 2012/0236586 A1 | 9/2012 | Wang |
| 2012/0250346 A1 | 10/2012 | Williams |
| 2012/0268966 A1 | 10/2012 | McCollum et al. |
| 2012/0281432 A1* | 11/2012 | Parker ............... F21V 29/70 362/609 |
| 2012/0287633 A1 | 11/2012 | Kelly et al. |
| 2012/0294037 A1 | 11/2012 | Holman et al. |
| 2013/0039050 A1 | 2/2013 | Dau |
| 2013/0208495 A1 | 8/2013 | Dau |
| 2013/0258699 A1 | 10/2013 | Weaver |
| 2013/0272015 A1 | 10/2013 | Weaver |
| 2013/0308338 A1* | 11/2013 | Lin ............... F21V 9/30 362/609 |
| 2013/0329433 A1* | 12/2013 | Lin ............... G02B 6/4214 362/294 |
| 2014/0043845 A1* | 2/2014 | Chen ............... G02B 6/0011 362/555 |
| 2014/0126235 A1 | 5/2014 | Speier |
| 2014/0340893 A1 | 11/2014 | Hsu et al. |
| 2015/0167940 A1* | 6/2015 | Ng ............... F21S 8/026 362/270 |
| 2017/0090102 A1* | 3/2017 | Holman ............... G02B 6/0061 |

FOREIGN PATENT DOCUMENTS

| | | |
|---|---|---|
| DE | 10 2011 001769 | 10/2012 |
| DE | 10 2011 090197 | 7/2013 |
| EP | 0 704 655 | 3/1999 |
| EP | 1 182 395 | 2/2002 |
| EP | 1744096 A1 | 1/2007 |
| EP | 2 163 701 | 3/2010 |
| EP | 2 196 725 | 6/2010 |
| EP | 2 264 359 | 12/2010 |
| EP | 2327340 A1 | 6/2011 |
| EP | 2 439 564 | 4/2012 |
| FR | 2784739 | 4/2000 |
| FR | 2934353 | 1/2010 |
| WO | WO 2001/07828 | 2/2001 |
| WO | WO 2002/050590 | 6/2002 |
| WO | WO 2003/009012 | 1/2003 |
| WO | WO 2005/073629 | 8/2005 |
| WO | WO 2005/090854 | 9/2005 |
| WO | WO2006064434 A1 | 6/2006 |
| WO | WO2007146373 A1 | 12/2007 |
| WO | WO 2008/007315 | 1/2008 |
| WO | WO2008017968 A1 | 2/2008 |
| WO | WO 2008/047278 | 4/2008 |
| WO | WO 2008/139383 | 11/2008 |
| WO | WO 2009/105168 | 8/2009 |
| WO | WO2009099547 A1 | 8/2009 |
| WO | WO 2010/079391 | 7/2010 |
| WO | WO2010103450 A1 | 9/2010 |
| WO | WO 2010/113091 | 10/2010 |
| WO | WO 2011/112914 | 9/2011 |
| WO | WO 2012/093126 | 7/2012 |
| WO | WO2012105314 A1 | 8/2012 |
| WO | WO 2012/131560 | 10/2012 |
| WO | WO 2012/176352 | 12/2012 |
| WO | WO 2013/023008 | 2/2013 |
| WO | WO 2013/066822 | 5/2013 |
| WO | WO 2013/154835 | 10/2013 |

OTHER PUBLICATIONS

European Application No. 17188348.1, Communication pursuant to Article 94(3) EPC dated Dec. 21, 2017, 7 pages.

Authorized Officer Blaine R. Copenheaver, Notification of Transmittal of the International Search Report and the Written Opinion of the International Searching Authority, International Application No. PCT/US2013/059416, dated Feb. 19, 2014, 9 pages.

Authorized Officer Blaine R. Copenheaver, Notification of Transmittal of the International Search Report and the Written Opinion of the International Searching Authority, International Application No. PCT/US2014/015255, dated May 19, 2014, 12 pages.

Authorized Officer Shane Thomas, Notification of Transmittal of International Search Report and Written Opinion, International Application No. PCT/US14/15707, dated May 29, 2014, 21 pages.

Authorized Officer Shane Thomas, Notification of Transmittal of International Search Report and Written Opinion, International Application No. PCT/US14/27583, dated Jul. 24, 2014, 12 pages.

Notification of Transmittal of the International Search Report and the Written Opinion of the International Searching Authority, International Application No. PCT/US2014/047296, dated Dec. 17, 2014, 11 pages.

Supplementary European Search Report for European Patent Application No. 12822822.8, dated Jul. 4, 2014, 3 pages.

Thomas, "International Search Report and Written Opinion" from co-pending PCT Application No. PCT/US13/24525 dated Apr. 16, 2013, 16 pages.

Young, "International Search Report and Written Opinion" from co-pending PCT Application No. PCT/US12/50046 dated Oct. 26, 2012, 34 pages.

http://www.everlight.com/datasheets/OL-Flat_Series_Data_Sheet_v5.pdf. "Datasheet: Office Lighting Flat Luminaire Series", product catalog, Everlight, Issue No. DBM-0000054_v5, May 5, 2011, pp. 1-5.

Philips Lighting Company, "Philips EnduraLED Candle LED Lamps", Downloaded from the internet at: www.lighting.philips.com/us_en/browseliterature/download/p-6027 on Jan. 27, 2012, 2 pages (2010).

* cited by examiner

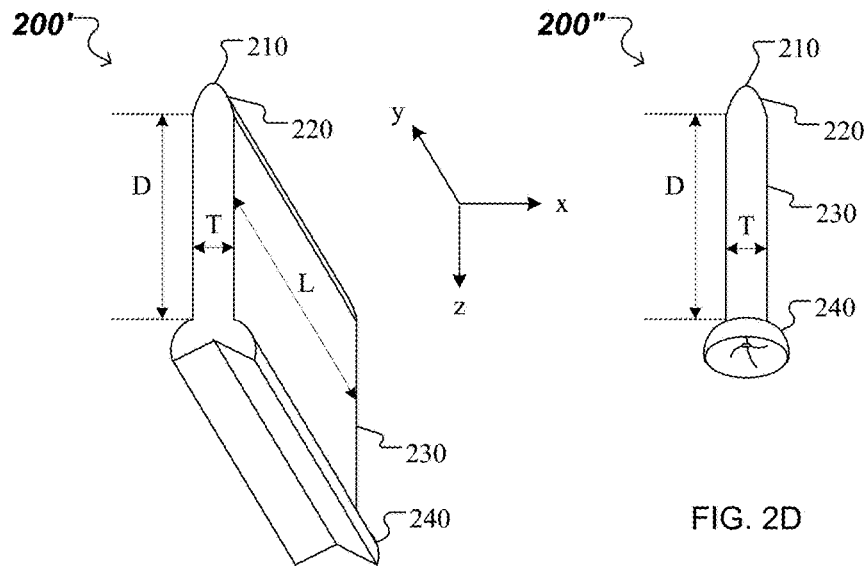
FIG. 2C
FIG. 2D
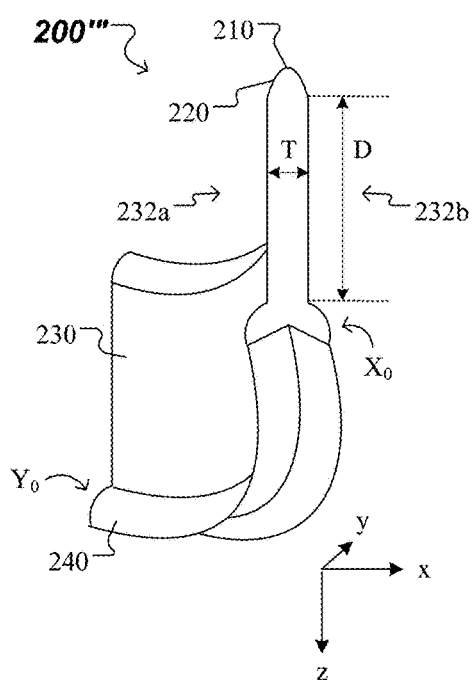
FIG. 2E
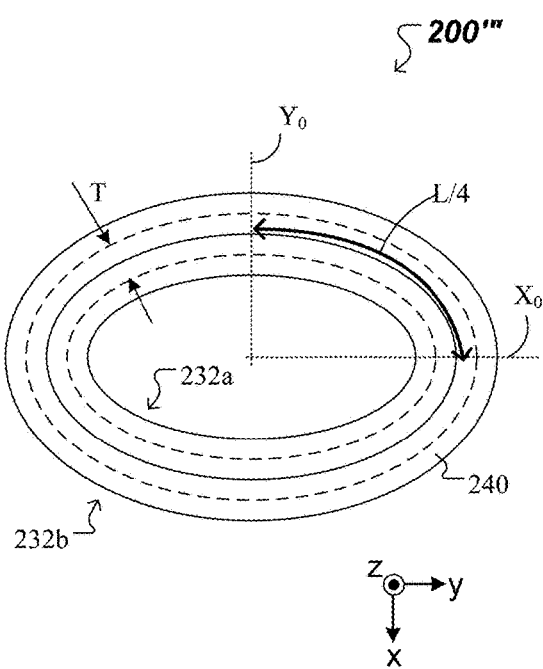
FIG. 2F

ILLUMINATION DEVICE IN WHICH SOURCE LIGHT INJECTION IS NON-PARALLEL TO DEVICE'S OPTICAL AXIS

CROSS-REFERENCE TO RELATED APPLICATIONS

This application is a continuation application and claims priority to U.S. patent application Ser. No. 14/417,787, filed Jan. 27, 2015, which is a U.S. National Stage of International Application No. PCT/US2014/047295, filed Jul. 18, 2014, which claims benefit under 35 U.S.C. § 119(e)(1) of U.S. Provisional Application No. 61/856,009, filed on Jul. 18, 2013, which are incorporated by reference herein.

TECHNICAL FIELD

The present disclosure relates to illumination devices, e.g., light guide luminaire modules, in which source light injection is non-parallel to the device's optical axis.

BACKGROUND

Source lights are used in a variety of applications, such as providing general illumination and providing light for electronic displays (e.g., LCDs). Historically, incandescent source lights have been widely used for general illumination purposes. Incandescent source lights produce light by heating a filament wire to a high temperature until it glows. The hot filament is protected from oxidation in the air with a glass enclosure that is filled with inert gas or evacuated. Incandescent source lights are gradually being replaced in many applications by other types of electric lights, such as fluorescent lamps, compact fluorescent lamps (CFL), cold cathode fluorescent lamps (CCFL), high-intensity discharge lamps, and solid state source lights, such as light-emitting diodes (LEDs).

SUMMARY

The present disclosure relates to illumination devices, e.g., light guide luminaire modules, in which source light injection is non-parallel to the device's optical axis.

In general, innovative aspects of the technologies described herein can be implemented in an illumination device that includes one or more of the following aspects:

In one aspect, an illumination device includes a light source configured to emit, during operation, light in an emission angular range, a prevalent direction of propagation of the emitted light in the emission angular range being different from a direction of an optical axis of the illumination device; and an optical coupler comprising a transparent material, the optical coupler having an input aperture, an exit aperture and a first side surface and a second side surface arranged between the input aperture and the exit aperture, the exit aperture being centered on the optical axis of the illumination device. The optical coupler receives, through the input aperture from the light source, the light emitted in the emission angular range. Further, the first side surface and the second side surface redirect the received light via total internal reflection (TIR) to the exit aperture. Additionally, the redirected light is issued through the exit aperture in a redirected angular range.

The foregoing and other embodiments can each optionally include one or more of the following features, alone or in combination. In some implementations, a prevalent direction of propagation of the redirected light in the redirected angular range can be along the optical axis of the illumination device. In some implementations, the redirected angular range can have a smaller divergence than the emission angular range. In some implementations, the light source includes an LED die. In some implementations, the light source can emit white light. In some implementations, the light source and the input aperture of the optical coupler can be immersion coupled. Here, the light source includes a phosphor layer and the phosphor layer is immersion coupled with the input aperture of the optical coupler.

In some implementations, each of the first side surface and the second side surface can have translational symmetry along an axis orthogonal to the optical axis of the illumination device and the prevalent direction of propagation of the emitted light in the emission angular range.

In some implementations, the prevalent direction of propagation of the emitted light in the emission angular range can be tilted relative the optical axis of the illumination device by a tilt angle less than a critical TIR angle, and the second side surface includes a curved portion and a flat portion, the flat portion being oriented along the optical axis of the illumination device. Here, the flat portion of the second side surface is adjacent the exit aperture. Moreover, the first side surface is a first logarithmic spiral which depends on the tilt angle and the critical TIR angle, the curved portion of the second side surface is a second logarithmic spiral which depends on the tilt angle, the critical TIR angle and a dimension of the light source, and the second side surface is continuous at an intersection of the curved portion with the flat portion. Further, a point of the exit aperture that is on the first side surface has the same coordinate along the optical axis of the illumination device as another point of the exit aperture that is on the flat portion of the second side surface.

In some implementations, the prevalent direction of propagation of the emitted light in the emission angular range is tilted relative the optical axis of the illumination device by a tilt angle equal to or larger than a critical TIR angle, and the second side surface is flat and oriented along the optical axis of the illumination device. Here, the first side surface is a logarithmic spiral which depends on the tilt angle and the critical TIR angle. Further, a point of the exit aperture that is on the first side surface has the same coordinate along the optical axis of the illumination device as another point of the exit aperture that is on the flat side surface.

In some implementations, the illumination device further includes a light guide including a receiving end and an opposing end that are disposed along the optical axis of the illumination device. The receiving end is arranged to receive the light issued by the optical coupler. Further, the light guide is configured to guide the light received at the receiving end in a forward direction toward the opposing end of the light guide. Additionally, the illumination device further includes an optical extractor located at the opposing end and configured to output the guided light into an ambient environment as output light in backward directions. Moreover, a numerical aperture of the light guide can be such that the light received from the optical coupler in the redirected angular range can be guided by the light guide via TIR. In some cases, the optical extractor can have at least one redirecting surface. Here, the at least one redirecting surface of the optical extractor is arranged and shaped to reflect at least a portion of the guided light in a direction that has a component orthogonal to the forward direction. In some other cases, the optical extractor can have a first redirecting surface arranged and shaped to reflect at least a portion of the guided light in a first direction that has a component orthogonal to the forward direction, and a second redirecting surface arranged and shaped to reflect at least a portion of the guided light in a second direction that has a component orthogonal to the forward direction and antiparallel to the orthogonal component of the first direction.

In some implementations, the illumination device further includes an optical extractor disposed on the optical axis of the illumination device and spaced apart from the exit aperture of the optical coupler by a separation distance. A combination of (i) the separation distance and (ii) a numerical aperture of the optical extractor is such that all the light issued by the optical coupler impinges on the optical extractor. Additionally, the optical extractor is configured to output into an ambient environment the light that impinges thereon as output light in backward directions opposing a prevalent direction of propagation of the light issued by the optical coupler. In some cases, the optical extractor can have at least one redirecting surface. Here, the at least one redirecting surface of the optical extractor is arranged and shaped to reflect at least a portion of the light that impinges thereon in a backward direction that has a component orthogonal to the prevalent direction of propagation of the light issued by the optical coupler. In other cases, the optical extractor can have a first redirecting surface arranged and shaped to reflect at least a portion of the light that impinges thereon in a first direction that has a component orthogonal to the prevalent direction of propagation of the light issued by the optical coupler, and a second redirecting surface arranged and shaped to reflect at least a portion of the light that impinges thereon in a second direction that has a component orthogonal to the prevalent direction of propagation of the light issued by the optical coupler and antiparallel to the orthogonal component of the first direction.

In another aspect, an optical coupler includes an input aperture disposed within a first plane; an exit aperture disposed within a second plane, such that the second plane intersects the first plane at an acute angle; and a first side surface and a second side surface extending between the input aperture and the exit aperture. The first and second side surfaces are configured to direct incident light from the input aperture to the exit aperture via total internal reflection.

The foregoing and other embodiments can each optionally include one or more of the following features, alone or in combination. In some implementations, each of the first side surface and the second side surface can have translational symmetry along an axis parallel to the first plane and the second plane.

In some implementations, the acute angle can be less than a critical TIR angle, and the second side surface includes a curved portion and a flat portion, where the flat portion is oriented orthogonal to the second plane. Here, the flat portion of the second side surface is adjacent the exit aperture. In some cases, the first side surface is a first logarithmic spiral which depends on the acute angle and the critical TIR angle, the curved portion of the second side surface is a second logarithmic spiral which depends on the acute angle, the critical TIR angle and a dimension of the input aperture, and the second side surface is continuous at an intersection of the curved portion with the flat portion. Further, a point of the exit aperture that is on the first side surface has the same coordinate along an axis orthogonal to the exit aperture as another point of the exit aperture that is on the flat portion of the second side surface.

In some implementations, the acute angle can be equal to or larger than a critical TIR angle, and the second side is flat and oriented orthogonal to the second plane. In this case, the first side surface is a logarithmic spiral which depends on the acute angle and the critical TIR angle. Further, a point of the exit aperture that is on the first side surface has the same coordinate along an axis orthogonal to the exit aperture as another point of the exit aperture that is on the flat side surface.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIGS. 2A-2H show aspects of luminaire modules in which source light injection is parallel to the luminaire modules' optical axis.

Reference numbers and designations in the various drawings indicate exemplary aspects, implementations of particular features of the present disclosure.

DETAILED DESCRIPTION

The present disclosure relates to optical couplers wherein input and exit apertures can have oblique orientations as well as illumination devices for providing direct and/or indirect illumination employing such optical couplers. The optical couplers are configured to receive light from an input aperture and direct the light to an exit aperture. The illumination devices can efficiently guide and distribute light from source lights such as solid-state source lights or pumped phosphors received at an input aperture towards work surfaces and/or background regions. The source lights can be oriented in oblique directions relative to an optical axis of the illumination device. In some implementations, the optical couplers can receive light emitted within solid angles of $2\pi$ steradian from a flat input aperture. In some implementations, the optical couplers are configured to direct light from the input aperture to the exit aperture via total internal reflection (TIR).

Depending on the implementation, one or more optical couplers can be used in an illumination device. The optical couplers can be used, for example, to direct light to an optical extractor of the illumination device. In some cases, light provided by an optical coupler at their exit apertures is guided to the optical extractor through a light guide. Light extracted by the optical extractor to an ambient environment can be directed to the work surfaces and/or towards background regions to provide illumination or other lighting functions.

Figure 1A:
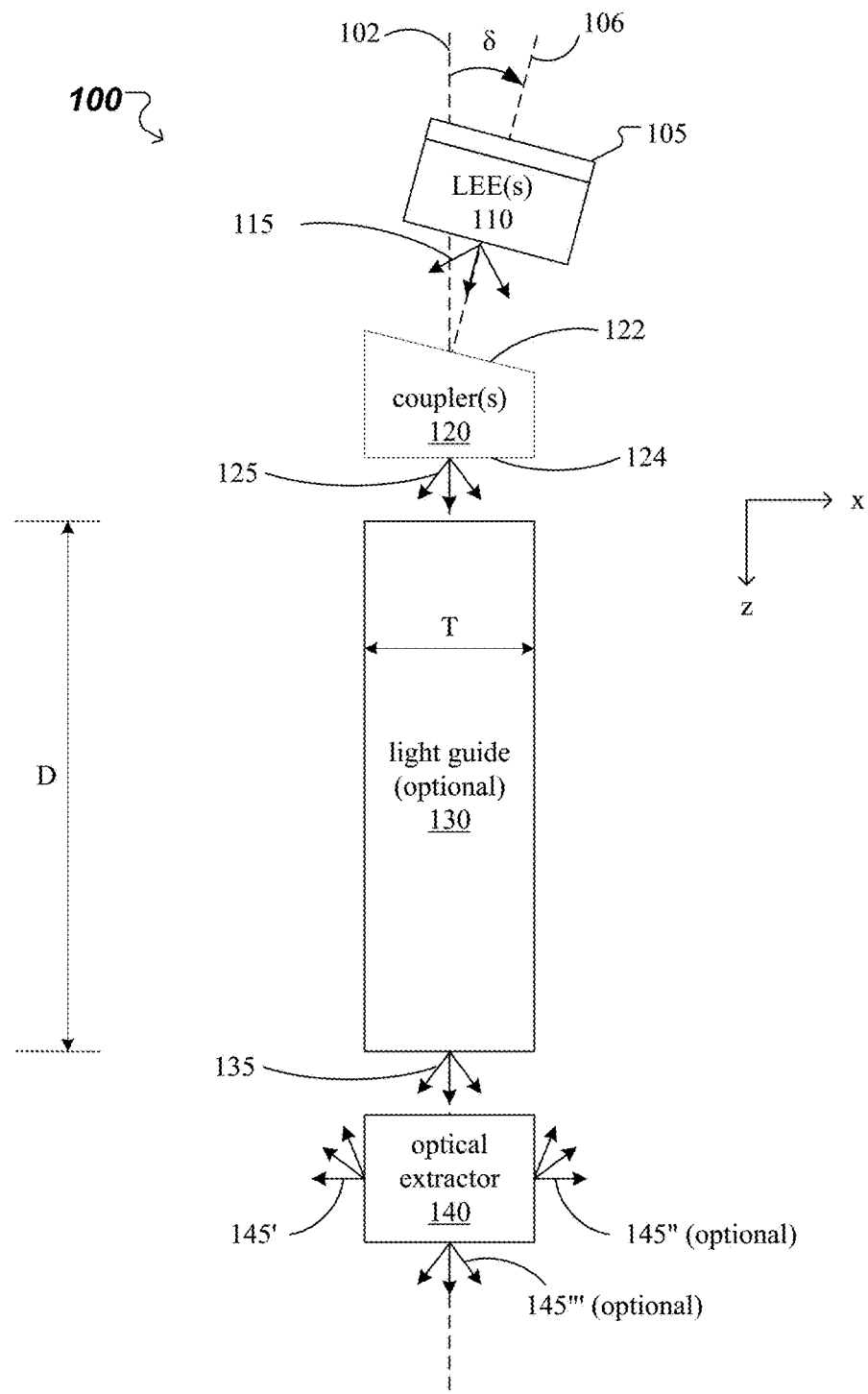
FIG. 1A shows an example of a luminaire module in which source light injection is non-parallel to the luminaire module's optical axis.

(i) Illumination Device in which Source Light Injection is Non-Parallel to the Device's Optical Axis FIG. 1A illustrates a block diagram of an illumination device 100 in which source light injection is non-parallel with the optical axis 102. The illumination device 100, also referred to as luminaire module 100, includes a substrate 105 having a normal inclined relative to the device's optical axis 102 by a finite angle δ, where 0<δ≤90°, one or more light emitting elements (LEEs) 110 arranged on the substrate, a corresponding one or more optical couplers 120, and an optical extractor 140. Here, the device's optical axis 102 is parallel to the z-axis and passes through an exit aperture 124 of the optical couplers 120 and through an input aperture of the optical extractor 140. The LEEs 110 emit light along an emission direction 106 parallel to the normal to the substrate 105, such that the emission direction 106 includes an angle δ relative to the device's optical axis 102. In this manner, the emitted light is injected into the optical couplers 120 through an input aperture 122 along the emission direction 106. In some implementations, the illumination device 100 further includes a light guide 130. In some implementations, the LEEs 110 are immersion coupled with the input apertures of the couplers 120. Depending on the implementation, such immersion coupling may be between the dies or phosphor layers, if any, or other components or interfaces of the LEEs 110. In some implementations, the couplers 120 may be immersion coupled with a phosphor layer (not illustrated in FIG. 1A) that is remote from the LEEs 110. Depending on the implementation, recovery cavities may be formed between LEEs and remote phosphors to provide a desired optical coupling.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have, for example, a Lambertian distribution relative to the optical axes of the one or more LEEs 110. Here, the optical axes of the LEEs 110 are parallel to the normal 106 to the substrate 105 which makes a non-zero angle δ with the device's optical axis 102 (e.g., the z-axis.)

The one or more couplers 120 receive the light from the LEEs 110 within the first angular range 115 at the input aperture 122 and provide light within a second angular range 125 at an exit aperture 124. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. (See, e.g., FIG. 1B.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

The one or more couplers 120 are shaped to transform the first angular range 115 into the second angular range 125 via total internal reflection, specular reflection or both. As such, the one or more couplers 120 can include a solid transparent material for propagating light from the input aperture 122 to the exit aperture 124 of each of the one or more couplers 120. In this manner, a prevalent direction of propagation of the second angular range 125 is along the z-axis, and hence, it is different from a prevalent direction of propagation of the first angular range 115, which is inclined by the angle δ relative the z-axis. Additionally, the divergence of the second angular range 125 is smaller than the divergence of the first angular range 115, to ensure that all light provided by the couplers 120 in the angular range 125 can be injected into the input aperture of the optical extractor 140. Here, a distance D between the exit aperture 124 of the optical couplers 120 and the input aperture of the optical extractor 140 can be 5, 10 or 20 cm, for instance. A combination of (i) a third angular range 135 in which the light is received by the optical extractor 140 and (ii) a numerical aperture of the optical extractor 140 is configured such that all the received light is injected into the input aperture of the optical extractor 140.

In some implementations, the illumination device includes the light guide 130. The light guide 130 can be made from a solid, transparent material. Here, the light guide 130 is arranged to receive the light provided by the optical couplers 120 in the second angular range 125 at one end of the light guide 130 and to guide the received light in a forward direction, e.g., along the device's optical axis 102 (in this case the z-axis), from the receiving end to an opposing end of the light guide 130. Here, a distance D between the receiving end of the light guide 130 and its opposing end can be 5, 10, 20, 50 or 100 cm, for instance. A combination of (i) the second angular range 125 in which the light is received by the light guide 130 at the receiving end and (ii) a numerical aperture of the light guide 130 is configured such that all the received light is guided from the receiving end to the opposing end through total internal reflection (TIR).

One or more of the light guide side surfaces can be planar, curved or otherwise shaped. The light guide side surfaces can be parallel or non-parallel. In embodiments with non-parallel light guide side surfaces, a third angular range 135 of the guided light at the opposing end of the light guide 130 is different than the angular range 125 of the light received at the receiving end. In embodiments with parallel light guide side surfaces, the third angular range 135 of the guided light at the opposing end of the light guide 130 has at least substantially the same divergence as the angular range 125 of the light received at the receiving end. In either of these embodiments, the light guide side surfaces are optically smooth to allow for the guided light to propagate forward (e.g., in the positive direction of the z-axis) inside the light guide 130 through TIR.

Additionally, the distance D (along the z-axis) between the optical couplers 120 and the optical extractor 140—for embodiments of the illumination device 100 without a light guide 130—or a combination of the length D of the light guide 130 and its thickness T (along the x-axis)—for embodiments of the illumination device 100 with a light guide 130—is chosen to homogenize the light emitted by the discrete LEEs 110—which are distributed along the y-axis—as it propagates from the couplers 120 (for embodiments of the illumination device 100 without a light guide 130) or is guided from the receiving end to the opposing end of the light guide 130 (for embodiments of the illumination device 100 with a light guide 130.) In this manner, the homogenizing of the emitted light—as it propagates from the optical couplers 120 to the optical extractor 140 or is guided through the light guide 130—causes a change of a discrete profile along the y-axis of the second angular range 125 to a continuous profile along the y-axis of the third angular range 135 in which the discrete profile is partially or fully blurred.

The optical extractor 140 outputs into the ambient environment the light received from the optical couplers 120 (for embodiments of the illumination device 100 without a light guide 130) or from the light guide 130 (for embodiments of the illumination device 100 with a light guide 130) in one or more output illumination distributions. As such, the light output by the extractor 140 has a first output angular range 145' that can be substantially continuous along the y-axis and has a first output propagation direction with a component opposite to the forward direction (e.g., antiparallel to the z-axis.) In some implementations, the light output by the extractor 140 has, in addition to the first output angular range 145', a second output angular range 145" that is substantially continuous along the y-axis and has a second output propagation direction with a component opposite to the forward direction (e.g., antiparallel to the z-axis.) In this case, the first output propagation direction and the second output propagation direction have respective component orthogonal to the forward direction that are opposite (antiparallel) to each other (antiparallel and parallel to the x-axis.) In some implementations, the light output by the extractor 140 has, in addition to the first output angular range 145' and the second output angular range 145", a third output angular range 145''' that can be substantially continuous along the y-axis and has a third output propagation direction along the forward direction (e.g., along the z-axis.)

As described above, the light guide 130 and the optical extractor 140 of illumination device 100 are arranged and configured to translate and redirect light emitted by LEEs 110 away from the LEEs before the light is output into the ambient environment. The spatial separation of the place of generation of the light, also referred to as the physical (light) source, from the place of extraction of the light, also referred to as a virtual source light or a virtual filament, can facilitate design of the illumination device 100. In this manner, a virtual filament can be configured to provide substantially non-isotropic light emission with respect to planes parallel to an optical axis of the illumination device (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 110, with their predetermined optical, thermal, electrical and mechanical constraints, from the place of light extraction, may facilitate a greater degree of design freedom of the illumination device 100 and allows for an extended optical path, which can permit a predetermined level of light mixing before light is output from the illumination device 100.

Figure 1B:
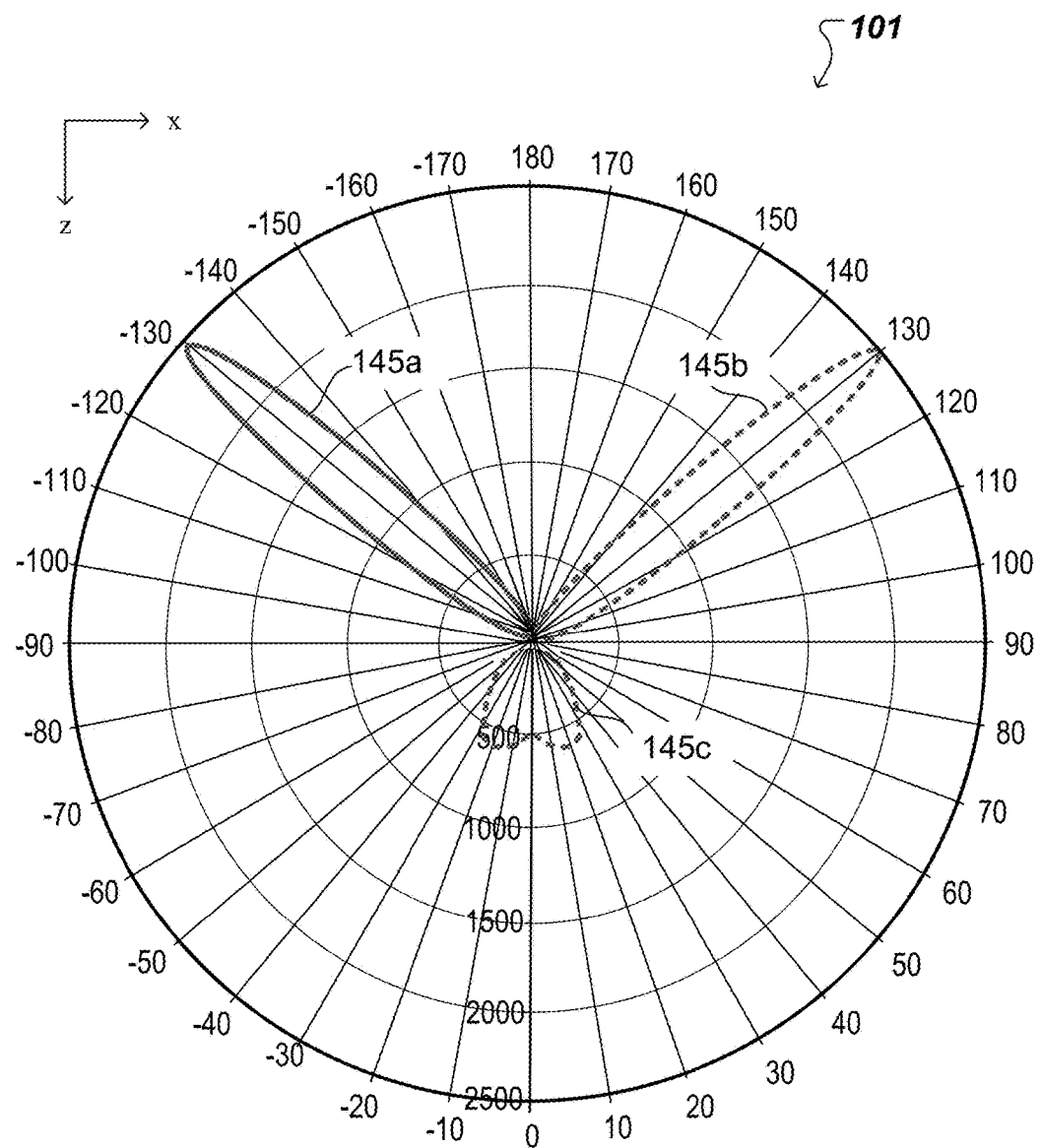
FIG. 1B is an example of an intensity profile of the luminaire module shown in FIG. 1A.

FIG. 1B shows an x-z cross-section of far-field light intensity profile 101 of an example illumination device 100 that is elongated along the y-axis (perpendicular to the sectional plane of FIG. 1A). In some implementations, the far-field light intensity profile 101 includes a first output lobe 145a representing light output by the illumination device 100 in the first output angular range 145'. In this case, a propagation direction of the first output angular range 145' is along the about −130° bisector of the first output lobe 145a.

In some implementations, in addition to the first output lobe 145a, the far-field light intensity profile 101 includes one or more of a second output lobe 145b representing light output by the illumination device 100 in the second output angular range 145" or a third output lobe 145c representing light output by the illumination device 100 in the third output angular range 145'''. In this example, a propagation direction of the second output angular range 145" is along the about +130° bisector of the second output lobe 145b and a propagation direction of the third output angular range 145''' is along the about 0° bisector of the third output lobe 145c. In other example illumination devices, first and second output lobes 145a and 145b can be asymmetrical. Further in this case, a divergence of each of the first output angular range 145' (represented by a width of the first output lobe 145a) or the second output angular range 145" (represented by a width of the second output lobe 145b) is smaller than a divergence of the third output angular range 145''' (represented by a width of the third output lobe 145c).

Orientation of the LEEs 110 relative the device's optical axis 102 (e.g., the z-axis) along with composition and geometry of the couplers 120, the light guide 130 and the extractor 140 of the illumination device 100 can affect the far-field light intensity profile 101, e.g., the propagation direction and divergence associated with the first output lobe 145a, and, optionally, of the one or more of the second and third output lobes 145b and 145c.

Prior to describing details of various embodiments of the illumination device 100 in which source light injection is non-parallel with the device's optical axis 102, a light guide illumination device is described in which source light injection is parallel with a device's optical axis.

Figure 2A:
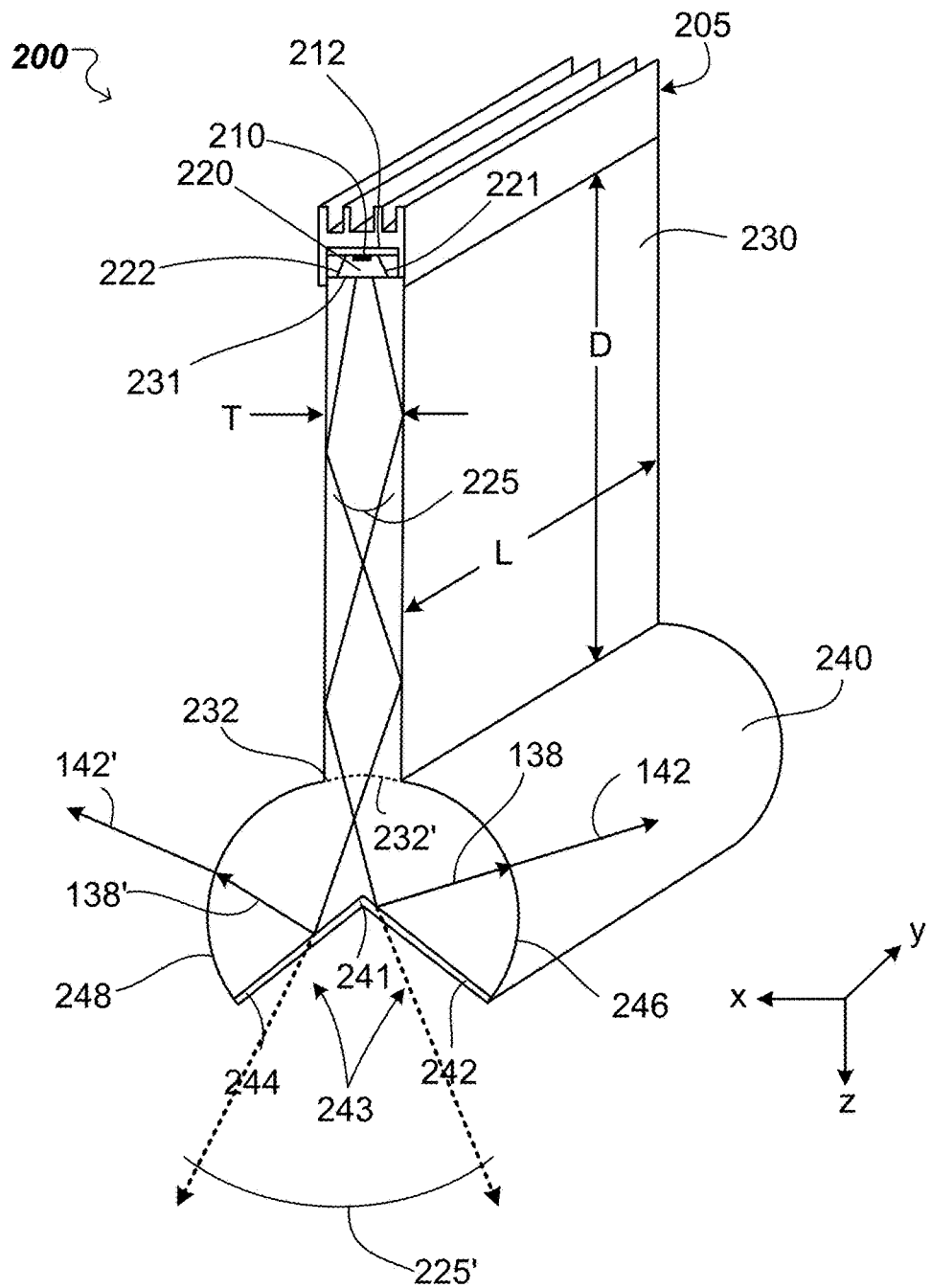

(ii) Luminaire Module in which Source Light Injection is Parallel with Luminaire Module's Optical Axis Referring to FIG. 2A, in which a Cartesian coordinate system is shown for reference, a luminaire module 200 includes a mount 212 having a plurality of LEEs 210 distributed along a first surface of the mount 212. The mount with the LEEs 210 is disposed at a first (e.g., upper) edge 231 of a light guide 230. Once again, the positive z-direction is referred to as the "forward" direction and the negative z-direction is the "backward" direction. Sections through the luminaire module 200 parallel to the x-z plane are referred to as the "cross-section" or "cross-sectional plane" of the luminaire module. Also, luminaire module 200 extends along the y-direction, so this direction is referred to as the "longitudinal" direction of the luminaire module. Implementations of luminaire modules can have a plane of symmetry parallel to the y-z plane, be curved or otherwise shaped. This is referred to as the "symmetry plane" of the luminaire module.

Multiple LEEs 210 are disposed on the first surface of the mount 212, although only one of the multiple LEEs 210 is shown in FIG. 2A. For example, the plurality of LEEs 210 can include multiple white LEDs. The LEEs 210 are optically coupled with one or more optical couplers 220 (only one of which is shown in FIG. 2A). An optical extractor 240 is disposed at second (e.g., lower) edge 232 of light guide 230.

Mount 212, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the mount 212 will generally depend, inter alia, on the length L, where more LEEs are used for longer luminaire modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 200 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. In some implementations, a heat-sink 205 can be attached to the mount 212 to extract heat emitted by the plurality of LEEs 210. The heat-sink 205 can be disposed on a surface of the mount 212 opposing the side of the mount 212 on which the LEEs 210 are disposed. The luminaire module 200 can include one or multiple types of LEEs, for example one or more subsets of LEEs in which each subset can have different color or color temperature.

Optical coupler 220 includes one or more solid pieces of transparent optical material (e.g., a glass material or a transparent organic plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid optical coupler 220 and a solid light guide 230 can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent organic plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 125) reflects off the planar surfaces of the light guide by TIR and spatially mixes within the light guide. The mixing can help achieve illuminance and/or color uniformity, along the y-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear source light, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor.

Optical extractor 240 is also composed of a solid piece of transparent optical material (e.g., a glass material or a transparent organic plastic, such as polycarbonate or acrylic) that can be the same as or different from the material forming light guide 230. In the example implementation shown in FIG. 2A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Surfaces 242 and 244 are coated with a reflective material (e.g., a highly reflective metal, such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 125 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. As such, some light is transmitted in the forward direction (along the z-axis) through surfaces 242 and 244 of the optical extractor 240 in an output angular range 125'. In some cases, the light transmitted in the output angular range 125' is refracted. In this way, the redirecting surface 243 acts as a beam splitter rather than a mirror, and transmits in the output angular range 125' a desired portion of incident light, while reflecting the remaining light in angular ranges 138 and 138'.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 200 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 200 corresponds to the emission spectrum of the LEEs 210. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n^2)^{(-1/2)}$, where R is the radius of curvature of the light-exit surfaces (246 and 248 in FIG. 2A) of the extractor 240 and n is the index of refraction of the portion of the extractor that is opposite of the wavelength-conversion material as viewed from the reflective surfaces (242 and 244 in FIG. 2A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138 towards the output surface 246, the second portion of the redirecting surface 244 provides light having an angular distribution 138' towards the output surface 246. The redirected light exits optical extractor through output surfaces 246 and 248. In general, the output surfaces 246 and 248 have optical power, to redirect the light exiting the optical extractor 240 in angular ranges 142 and 142', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the luminaire module 200 is attached to a ceiling of a room (e.g., the forward direction is towards the floor) such configurations can help avoid glare and an appearance of non-uniform illuminance.

In general, the light intensity distribution provided by luminaire module 200 reflects the symmetry of the luminaire module's structure about the y-z plane. For example, referring to FIG. 1B, light output in angular range 142' corresponds to the first output lobe 145a of the far-field light intensity distribution 101, light output in angular range 142 corresponds to the second output lobe 145b of the far-field light intensity distribution 101 and light output (leaked) in angular range 125' corresponds to the third output lobe 145c of the far-field light intensity distribution 101. In general, an intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the first 145a and second 145b output lobes in the far-field light intensity profile 101. Additionally, a ratio of an amount of light in the combination of first 145a and second 145b output lobes and light in the third output lobe 145c is controlled by reflectivity and transmissivity of the redirecting surfaces 242 and 244. For example, for a reflectivity of 90% and transmissivity of 10% of the redirecting surfaces 242, 244, 45% of light can be output in the output angular range 142' corresponding to the first output lobe 145a, 45% light can be output in the output angular range 142 corresponding to the second output lobe 145*b*, and 10% of light can be output in the output angular range 125' corresponding to the third output lobe 145*c*.

In some implementations, the orientation of the output lobes 145*a*, 145*b* can be adjusted based on the included angle of the v-shaped groove 241 formed by the portions of the redirecting surface 242 and 244. For example, a first included angle results in a far-field light intensity distribution 101 with output lobes 145*a*, 145*b* located at relatively smaller angles compared to output lobes 145*a*, 145*b* of the far-field light intensity distribution 101 that results for a second included angle larger than the first angle. In this manner, light can be extracted from the luminaire module 200 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or composite. Curved redirecting surfaces 242 and 244 can be used to narrow or widen the output lobes 145*a*, 145*b*. Depending of the divergence of the angular range 125 of the light that is received at the input end of the optical extractor 232', concave reflective surfaces 242, 244 can narrow the lobes 145*a*, 145*b* output by the optical extractor 240 (and illustrated in FIG. 1B), while convex reflective surfaces 242, 244 can widen the lobes 145*a*, 145*b* output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to output light into different output angular ranges 142, 142' from those shown in FIG. 2A. In some implementations, illumination devices can output light into lobes 142*a*, 142*b* that have a different divergence or propagation direction than those shown in FIG. 1B. For example, in general, the output lobes 145*a*, 145*b* can have a width of up to about 90° (e.g., 80° or less, 70° or less, 60° or less, 50° or less, 40° or less, 30° or less, 20° or less). In general, the direction in which the output lobes 145*a*, 145*b* are oriented can also differ from the directions shown in FIG. 1B. The "direction" refers to the direction at which a lobe is brightest. In FIG. 1B, for example, the output lobes 145*a*, 145*b* are oriented at approx. −130° and approximately +130°. In general, output lobes 145*a*, 145*b* can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The luminaire modules can include other features useful for tailoring the intensity profile. For example, in some implementations, luminaire modules can include an optically diffuse material that can diffuse light in a controlled manner to aid homogenizing the luminaire module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on surface of the circular structure and has an angle of incidence less than the critical angle and will exit circular structure without experiencing TIR. Light rays propagating within spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n^2)^{(-1/2)}$, which is smaller than R/n, will be subject to small Fresnel reflection at the surface of radius R when exiting the circular structure. This condition may be referred to as Brewster geometry. Implementations may be configured accordingly.

In some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 244 and 246 exits through surfaces 246 and 248, respectively, without experiencing TIR.

Figure 2B:
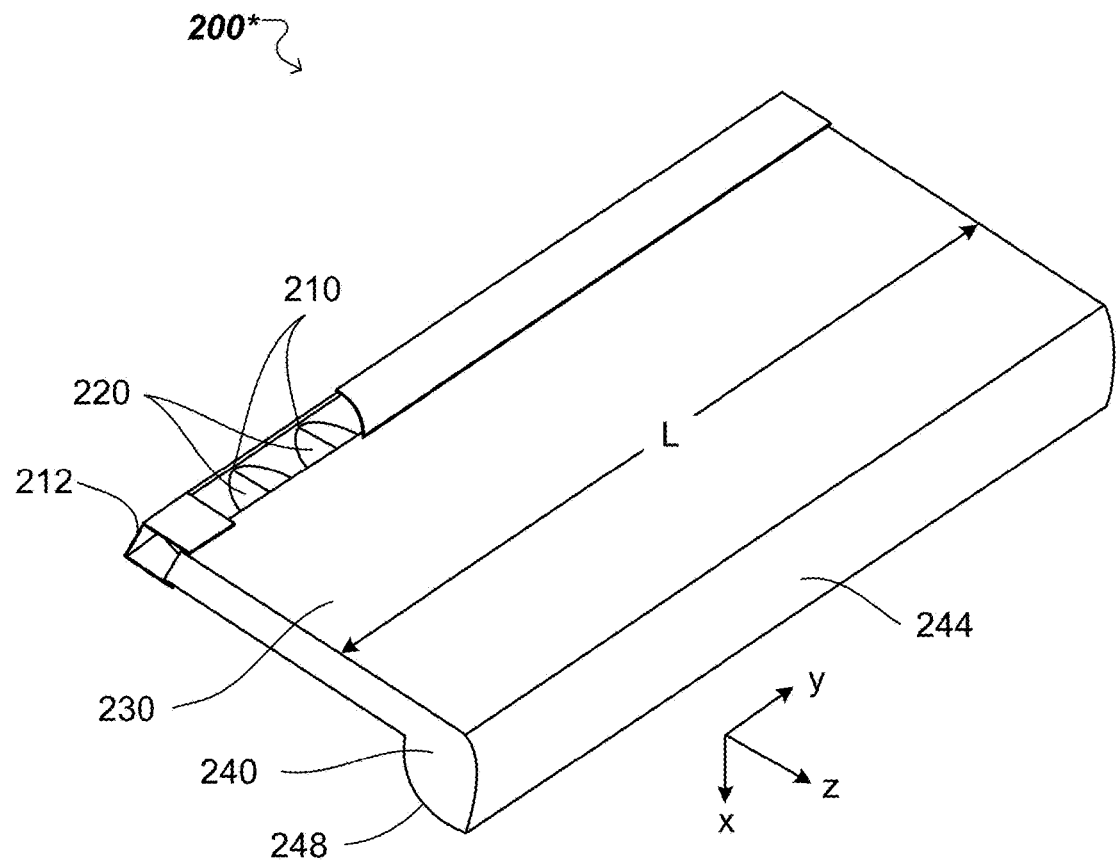

In the example implementations described above in connection with FIG. 2A, the luminaire module 200 is configured to output light into output angular ranges 142, 142' and optionally 125'. In other implementations, the light guide-based luminaire module 200 is modified to output light into a single output angular range 142'. FIG. 2B illustrates an example of such light guide-based luminaire module 200* configured to output light on a single side of the light guide 230. The luminaire module 200* is referred to as a single-sided luminaire module. The single-sided luminaire module 200* is elongated along the y-axis like the luminaire module 200 shown in FIG. 2A. Also like the luminaire module 200, the single-sided luminaire module 200* includes a mount 212 and LEEs 210 disposed on a surface of the mount 212 along the y-axis to emit light in a first angular range. The single-sided luminaire module 200* further includes an optical coupler 220 arranged and configured to redirect the light emitted by the LEEs 210 in the first angular range into a second angular range 125 that has a divergence smaller than the divergence of the first angular range at least in the x-z cross-section. Also, the single-sided luminaire module 200* includes a light guide 230 to guide the light redirected by the optical coupler 220 in the second angular range 125 from a first end 231 of the light guide to a second end 232 of the light guide. Additionally, the single-sided luminaire module 200* includes a single-sided extractor (denoted 240') to receive the light guided by the light guide 230. The single-sided extractor 240' includes a redirecting surface 244 to redirect the light received from the light guide 230 into a third angular range 138'—like described for luminaire module 200 with reference to FIG. 2A—and an output surface 248 to output the light redirected by the redirecting surface 244 in the third angular range 138' into a fourth angular range 142'.

A light intensity profile of the single-sided luminaire module 200* is represented in FIG. 1B as a single output lobe 145a. The single output lobe 145a corresponds to light output by the single-sided luminaire module 200* in the fourth angular range 142'.

FIG. 2C shows an embodiment 200' of the luminaire module 200 that also is elongated along an axis (e.g., y-axis) perpendicular to the forward direction (e.g., along the z-axis.) In this case, a length L of the light guide 230 along the elongated dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05D, 0.1D or 0.2D, for instance, light from multiple, point-like LEEs 210—distributed along the elongated dimension L—that is edge-coupled into the light guide 230 at the receiving end can efficiently mix and become uniform (quasi-continuous) along the y-axis by the time it propagates to the opposing end.

FIG. 2D shows a luminaire module 200" that has (e.g., continuous or discrete) rotational symmetry about the forward direction (e.g., z-axis.) Here, a diameter T of the light guide 230 is a fraction of the distance D traveled by the guided light from the receiving end to the opposing end of the light guide 230. For example, the diameter of the light guide 230 can be T=0.05D, 0.1D or 0.2D, for instance.

Other open and closed shapes of the luminaire module 200 are possible. FIGS. 2E and 2F show a perspective view and a bottom view, respectively, of a luminaire module 200''' for which the light guide 230 has two opposing side surfaces 232a, 232b that form a closed cylinder shell of thickness T. In the example illustrated in FIGS. 2E and 2F, the x-y cross-section of the cylinder shell formed by the opposing side surfaces 232a, 232b is oval. In other cases, the x-y cross-section of the cylinder shell can be circular or can have other shapes. Some implementations of the example luminaire module 200''' may include a specular reflective coating on the side surface 232a of the light guide 230. For T=0.05D, 0.1D or 0.2D, for instance, light from multiple, point-like LEEs 210—distributed around the z-axis along an elliptical path of length L—that is edge-coupled into the light guide 230 at the receiving end can efficiently mix and become uniform (quasi-continuous) along such an elliptical path by the time it propagates to the opposing end.

Figure 2G:
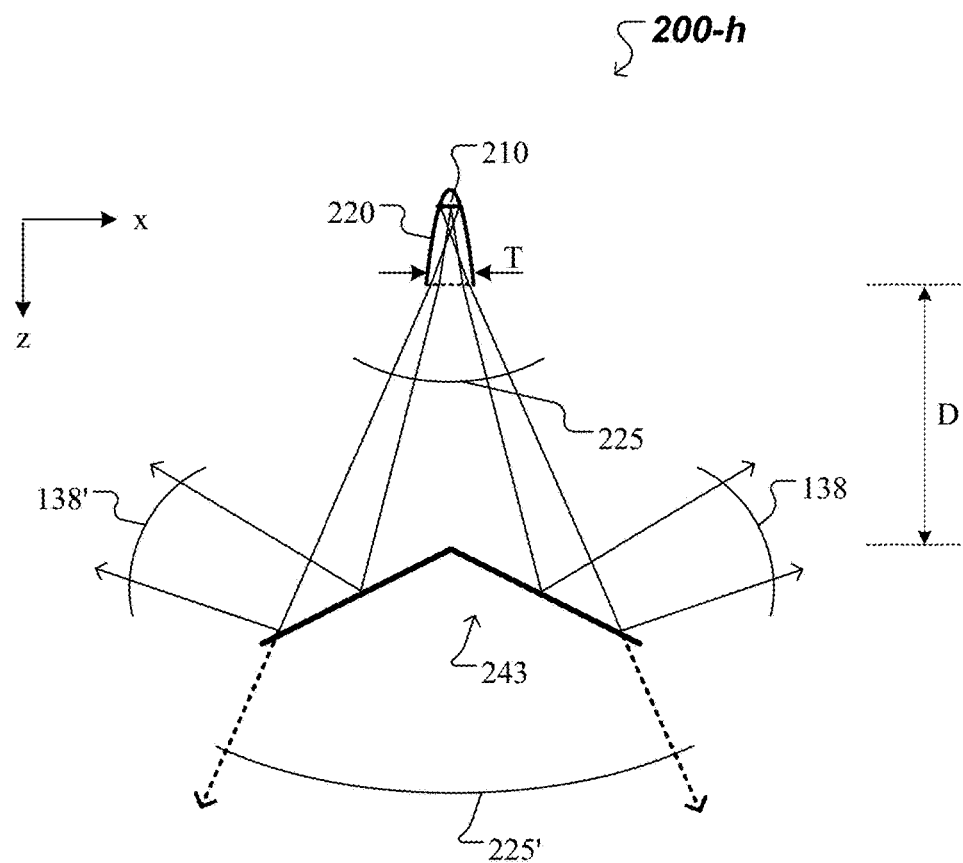

In the example implementations described above in connection with FIG. 2A, the luminaire module 200 includes a light guide 230 to guide (translate) light from the exit aperture of the optical couplers 220 to the input end 231' of the optical extractor 240. FIG. 2G illustrates an example of such "hollow" luminaire module 200-h that includes LEEs 210, one or more corresponding optical couplers 220 (like the luminaire module 200) and an optical extractor (simplified relative to the optical extractor 240 of the luminaire module 200) that uses only a redirecting surface 243 to extract—to the ambient environment—the light provided by the optical couplers 220. The hollow luminaire module 200-h is elongated along the y-axis like the luminaire module 200 shown in FIG. 2A. Also like the luminaire module 200, the hollow luminaire module 200-h includes a mount 212 (having a normal along the z-axis) such that the LEEs 210 are disposed on a surface of the mount 212 along the y-axis to emit light in a first angular range along the z-axis. The optical couplers 220 are arranged and configured to redirect the light emitted by the LEEs 210 in the first angular range into a second angular range 125 that has a divergence smaller than the divergence of the first angular range at least in the x-z cross-section.

Here, the redirecting surface 243 is spaced apart from an exit aperture of the optical couplers 220 by a distance D and includes two reflecting surfaces arranged to form a v-groove with an apex pointing toward the optical couplers 220. The distance D is selected based on a divergence of the second angular range 225 and of a transverse dimension (along the x-axis) of the redirecting surface 243, such that all light provided by the optical couplers in the second angular range 225 impinges on the redirecting surface 243. In this manner, a portion of the redirecting surface 243 redirects some of the light received from the optical couplers 220 into a third angular range 138' and another portion of the redirecting surface 243 redirects the remaining light received from the optical couplers 220 into a fourth angular range 138. In some cases, the redirecting surface 243 is semitransparent. In this manner, a fraction of the light received from the optical couplers 220 in angular range 225 is transmitted (leaks) through the redirecting surface 243 in a fifth angular range 225'. A prevalent propagation direction for the fifth angular range 225' is in the forward direction (along the z-axis.) A light intensity profile of the hollow luminaire module 200-h can be represented similar to the one shown in FIG. 1B as first 145a and second 145b output lobes, and optionally as an additional third output lobe 145c. By comparison, the first output lobe 145a corresponds to light output by the hollow luminaire module 200-h in the third angular range 138', the second output lobe 145b corresponds to light output by the hollow luminaire module 200-h in the fourth angular range 138, and the third output lobe 145c corresponds to light output by the hollow luminaire module 200-h in the fifth angular range 225'.

EXAMPLE 1

Parallel Source Light Injection

Figure 2H:
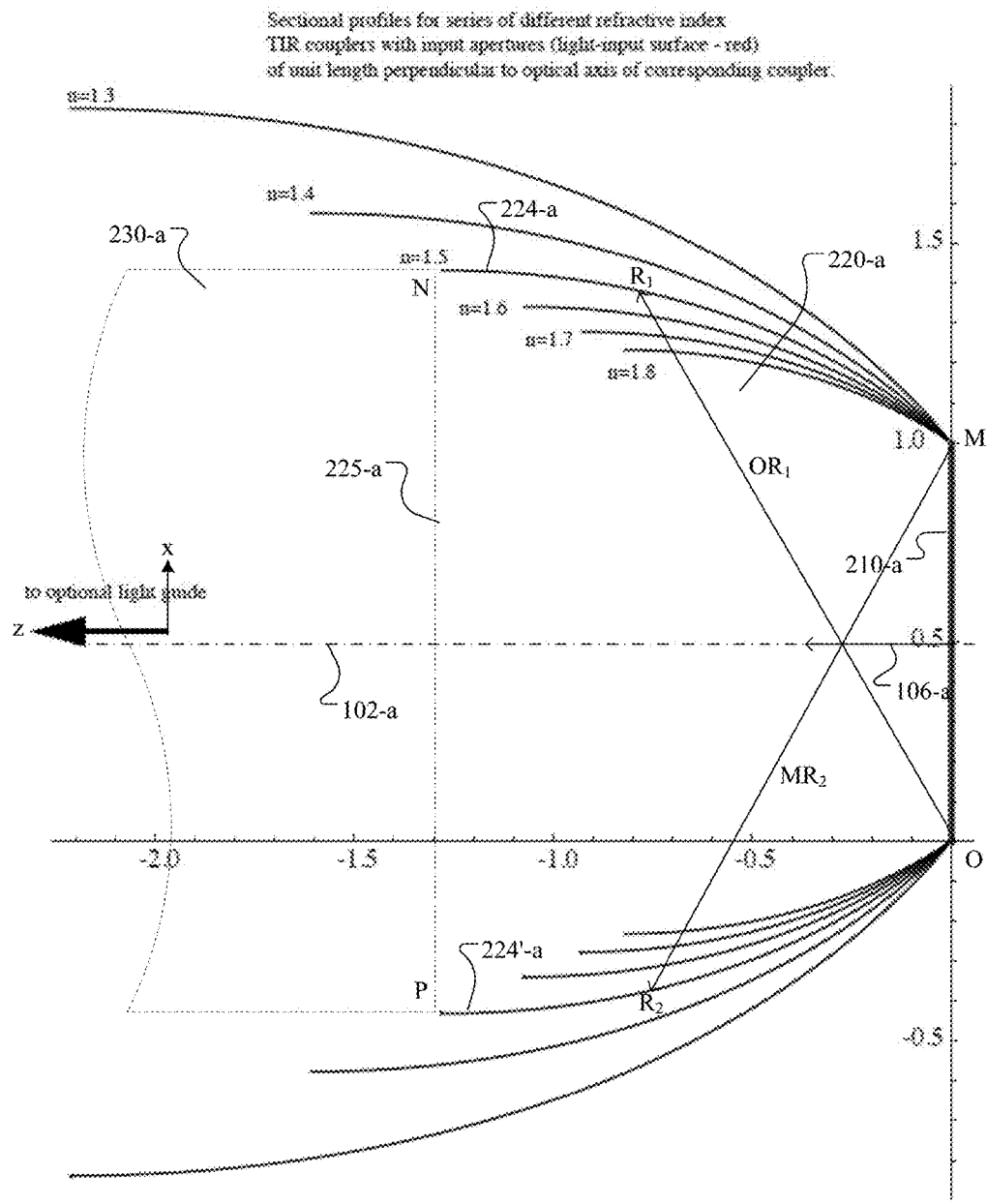

FIG. 2H is a cross-section of an optical coupler 220-a that can be used in the luminaire modules 200, 200*, 200', 200", 200''' or 200-h, for example, to receive light emitted by a light source 210-a. The optical coupler 220-a is configured to redirect the received light along an optical axis 102-a of the optical coupler 220-a. It can be configured to do so using only TIR. The shape of the side surfaces of a compact sized optical coupler that can rely only on TIR is described in detail below. Here, an emission direction 106-a of the light source 210-a—representing a prevalent propagation direction of the light emitted by the light source 210-a—is parallel to the z-axis; equivalently, an angle δ between the emission direction 106-a and the z-axis is zero. Further in this example, the optical axis 102-*a* of the optical coupler 220-*a* is centered on an exit aperture 225-*a* of the optical coupler 220-*a* and also is parallel to the z-axis. The optical axis 102-*a* coincides with the optical axis of the luminaire module.

A width of the light source 210-*a* along a direction orthogonal to the optical coupler' optical axis 102-*a* (e.g., along the x-axis) is 1-unit length. Here, the light source 210-*a* can be an extended light source (e.g., emitting light uniformly from each surface element of the light source 210-*a*) or one or more LEEs 210 that are part of an LED die, for example. The LEEs 210 can include multiple (e.g., LED) emitters, such as an array of emitters in a single package, or an array of emitters disposed on a substrate having a normal 106-*a*. In the sectional profile illustrated in FIG. 2H, the light source 210-*a* is represented by segment OM, where the point O is the origin of a Cartesian coordinate system.

As noted above in connection with FIG. 2A, the optical coupler 220-*a* includes one or more solid pieces of transparent material (e.g., glass or a transparent organic plastic, such as polycarbonate or acrylic). An input aperture of the optical coupler 220-*a* is optically coupled with the light source 210-*a*. In this example, a width of the input aperture matches the width of the light source 210-*a* along the x-axis normalized to 1-unit length like the value of the width of the light source 210-*a*.

In some implementations, the exit aperture 225-*a* of the optical coupler 220-*a* is optically coupled to the input end of a light guide 230-*a*. The optical coupler 220-*a* and light guide 230-*a* can be coupled by using a material that substantially matches the refractive index of the material forming the optical coupler 220-*a* or the light guide 230-*a*, or both. For example, the optical coupler 220-*a* can be affixed to the light guide 230-*a* using an index matching fluid, grease, or adhesive. As another example, the optical coupler 220-*a* is fused to the light guide 230-*a* or they are integrally formed from a single piece of material. In this manner, redirected light output by the optical coupler 220-*a* through the exit aperture 225-*a* is guided by the light guide 230-*a* to an optical extractor coupled at an opposing end of the light guide 230-*a*. In other implementations, when the optical coupler 220-*a* is part of a luminaire module without light guide, similar to the luminaire module 200-*h*, redirected light output by the optical coupler 220-*a* through the exit aperture 225-*a* is provided to an optical extractor spaced apart from the optical coupler 220-*a* by a distance D (not shown in FIG. 2H). In the sectional profile illustrated in FIG. 2H, the exit aperture 225-*a* is represented by segment NP.

Additionally, the optical coupler 220-*a* includes curved side surfaces 224-*a*, 224'-*a* that are shaped such the light emitted from any point of the light source 210-*a* is incident on the curved side surfaces 224-*a*, 224'-*a* at angles that exceed a critical angle θc. The critical angle θc is equal to ArcCos($n_{ambient}/n_{optical-coupler}$). When the ambient is air, $n_{ambient} \approx 1$, and $n_{optical-coupler}=n$, the critical angle θc=ArcCos(1/n). FIG. 2H shows cross-sections of multiple TIR optical couplers 220-*a* for refractive indices n=1.3, 1.4, 1.5, 1.6, 1.7 and 1.8.

For the examples illustrated in FIG. 2H, all light emitted by the light source 210-*a* is redirected by the optical coupler 220-*a* via TIR towards the exit aperture 225-*a*. In the sectional profile illustrated in FIG. 2H, the curved side surface 224-*a* is represented by curve MM and the curved side surface 224'-*a* is represented by curve OP, where the point O is the origin of the Cartesian coordinate system.

Any point $R_1$ of the curved side surface 224-*a*—for which a segment $OR_1$ is inclined by an angle α relative to the segment OM—is separated from the point O of the light source 210-*a* by a distance $OR_1(\alpha)$ given by $$OR_1(\alpha)=e^{\alpha \, tan \, \Theta_c} \quad (1).$$

Here, the angle α satisfies 0≤α≤θc. Point N on the output aperture 225-*a* is part of the curved side surface 224-*a* and separated from the point O of the light source 210-*a* by a distance ON=$OR_1(\alpha=\theta c)$. Similarly, any point $R_2$ of the curved side surface 224'-*a*—for which a segment $MR_2$ is inclined by an angle β relative to the segment MO—is separated from the point M of the light source 210-*a* by a distance $MR_2(\beta)$ given by $$MR_2(\beta)=e^{\beta \, tan \, \Theta_C} \quad (2).$$

Here, the angle β satisfies 0≤β≤θc. Point P on the output aperture 225-*a* is separated from the point M of the light source 210-*a* by a distance MP=$MR_2(\beta=\theta c)$. Generally, each of equations (1) and (2) describes a curve known as an equiangular spiral (also called a logarithmic spiral), which is a compact shape that can effectuate the TIR condition. In this case, the sectional profile of the curved side surface 224'-*a*—given by equation (2)—and represented by curve OP—is the mirror inverse of the sectional profile of the curved side surface 224-*a* given by equation (1)—and represented by curve MN.

To accommodate tolerances in manufacturing and material properties, the side surfaces can be shaped based on a notional critical angle that is slightly enlarged from the nominal critical angle associated with the nominal properties of the materials employed in the fabrication of the optical coupler.

The curved side surfaces 224-*a*, 224'-*a* may be continuously rotationally symmetric about the optical axis 102-*a* of the optical coupler 220-*a* (like in the luminaire module 200" illustrated in FIG. 2D) or have translational symmetry along an axis perpendicular to the sectional plane of FIG. 2H, e.g., along the y-axis, (like in the luminaire modules 200, 200* or 200' illustrated in FIGS. 2A-2C.)

Equations (1) and (2) can be used to determine a length (along the optical axis 102-*a*, e.g., the z-axis) of the optical coupler 220-*a* and a width (along the x-axis) of the exit aperture 225-*a*. The length of the optical coupler 220-*a* is given by a distance between the optical source 210-*a* (segment OM) and the exit aperture 225-*a* (segment NP). Additionally, the width of the exit aperture 225-*a* is equivalent to a length of segment NP. Note that in the example illustrated in FIG. 2H, the length of the optical coupler 220-*a* and the width of the exit aperture 225-*a* (and, hence, a volume and mass of the optical coupler 220-*a*) increase with decreasing refractive index. For example, for n=1.5, the length of the optical coupler 220-*a* is about 1.3 unit-lengths, and the width of the exit aperture 225-*a* is about 1.8 unit-lengths.

Luminaire modules like the ones described in this section—in which source light injection is parallel to the device's optical axis—can be modified to obtain luminaire modules in which source light injection is non-parallel to the devices' optical axis, as described in the following section.

Figure 3:
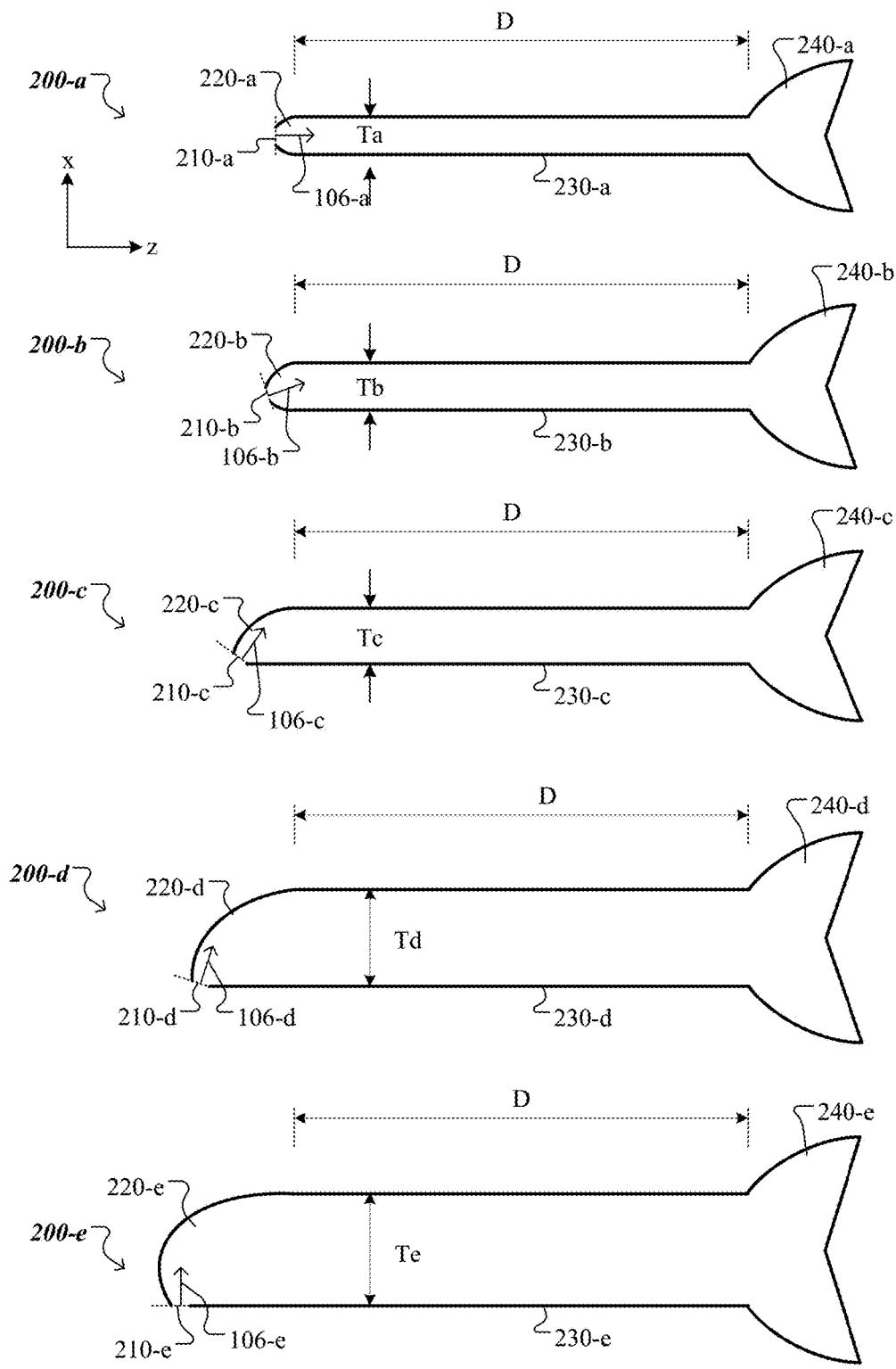
FIG. 3 shows example luminaire modules with different angles of source light injection relative to the luminaire modules' optical axis.

(iii) Illumination Devices in which Source Light Injection is Non-Parallel to the Devices' Optical Axis FIG. 3 shows examples of illumination devices 200-*b*, 200-*c*, 200-*d* and 200*e* in which source light injection is non-parallel to an optical axis of the devices. FIG. 3 also illustrates—for comparison—an example of illumination device 200-*a*, similar to the luminaire module 200 or 200' described above in connection with respective FIG. 2A or 2C, in which source light injection is parallel to an optical axis of the device. Here, the optical axis of each of the devices 200-a, 200-b, 200-c, 200-d and 200e is the z-axis.

Each illumination device 200-j, where j is in the set {a, b, c, d, e}, includes a light source 210-j and one or more optical couplers 220-j. The light source 210-j is oriented relative the optical axis of the illumination device 200-j such that an emission direction 106-j of the light source 210-j is different for each illumination device 200-j. As described above, the emission direction 106-j represents a prevalent propagation direction of the light emitted by the light source 210-j. In some implementations, the light source 210-j is elongated orthogonally relative the optical axis of the illumination device 200-j, e.g., with a longitudinal dimension L along the y-axis, as illustrated in FIG. 2A or 2C. In this case, L can be 1', 2' or 4', for instance. In other implementations, the illumination device can have another elongated configuration, as illustrated in FIGS. 2E-2F. In these implementations, a single optical coupler 220-j also is elongated in the same manner as the light source 210-j, e.g., along the y-axis, or multiple optical couplers 220-j are distributed along the longitudinal dimension L of the light source 210-j. In some other implementations, the light source 210-j can have a non-elongated configuration, e.g., with rotational symmetry around the z-axis, as illustrated in FIG. 2D.

Moreover, the optical couplers 220-j redirect, using TIR only, the light received from the light source 210-j under the emission direction 106-j and provides the redirected light along the optical axis (e.g., the z-axis) of the illumination device 200-j. As such, the optical couplers 220-j are referred to as TIR optical couplers 220-j.

In the examples illustrated in FIG. 3, the illumination device 200-j also includes a light guide 230-j and an optical extractor 240-j, where j is in the set {a, b, c, d, e}. When needed to accommodate the single TIR optical coupler 220-j that is elongated along the optical axis of the illumination device 200-j, e.g., along the y-axis, or the multiple TIR optical couplers 220-j that are distributed along the y-axis, the light guide 230-j and the extractor 240-j also are elongated along the y-axis with the longitudinal dimension L, as illustrated in FIG. 2A or 2C.

The light guide 230-j guides the light—provided by the TIR optical couplers 220-j at an input end of the light guide 230-j—from the input end to an opposing end along the optical axis of the illumination device 200-j, e.g., the z-axis. The optical extractor 240-j is coupled with the light guide 230-j at the opposing end to receive the guided light. As described above in connection with FIG. 2A, the optical extractor 240-j outputs most of the light received from the light guide 230-j to an ambient environment along a first backward direction that has a component orthogonal to the optical axis of the illumination device 200-j and as second backward direction that has a component (i) orthogonal to the optical axis of the illumination device 200-j and (ii) opposing the orthogonal component of the first backward direction. The light output by the optical extractor 240-j along the first backward direction corresponds to the first output lobe 145a of the far field intensity profile shown in FIG. 1B, and the light output by the optical extractor 240-j along the second backward direction corresponds to the second output lobe 145b. In some implementations, the optical extractor 240-j transmits a fraction of the light received from the light guide 230-j to the ambient environment along the forward direction. The light output by the optical extractor 240-j in the forward direction corresponds to the third output lobe 145c.

In the case of illumination device 200-a, the emission direction 106-a is parallel to the optical axis of the illumination device 200-a. Such parallel source light injection associated with a combination of light source 210-a and TIR optical coupler 220-a of the illumination device 200-a is described above in connection with FIG. 2H.

In the case of illumination device 200-j, where j is in the set {b, c, d}, the emission direction 106-a is oblique to the optical axis of the illumination device 200-j. In the case of illumination device 200-e, the emission direction 106-e is orthogonal to the optical axis of the illumination device 200-e. These cases of non-parallel source light injection associated with each of the combinations of light source 210-j and optical coupler 220-j of respective illumination devices 200-j, where j is in the set {b, c, d, e}, is discussed below.

EXAMPLE 2

Oblique Light Injection Under an Angle Less than a Critical Angle

Figure 4:
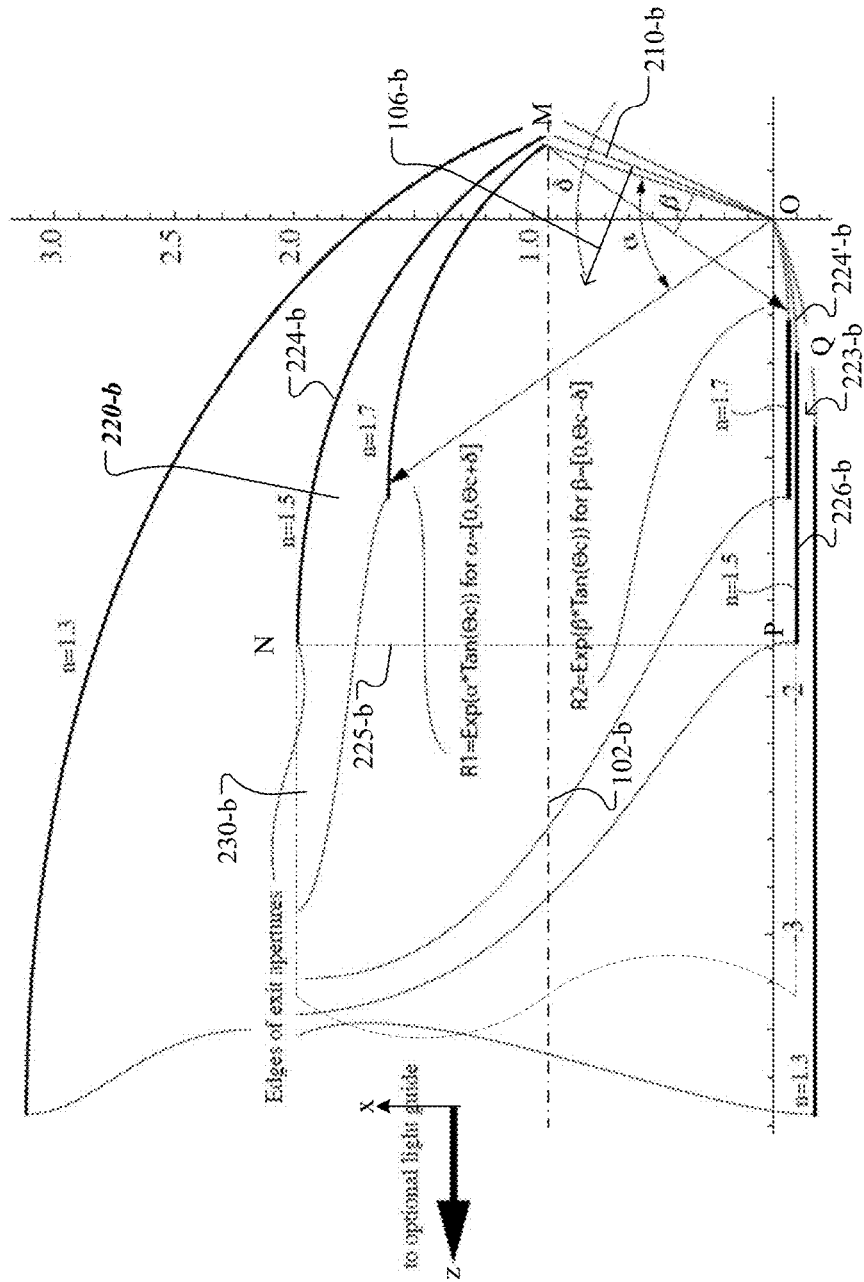
FIGS. 4-8 show aspects of non-parallel source light injection for the luminaire modules shown in FIG. 3.

FIG. 4 is a cross-section of a TIR optical coupler 220-b used in the illumination device 200-b to receive light emitted by a light source 210-b and to redirect the received light along an optical axis 102-b of the optical coupler 220-b using only TIR. Here, an emission direction 106-b of the light source 210-b—representing a prevalent propagation direction of the light emitted by the light source 210-b—forms a tilt angle $\delta$ with the optical axis 102-b. Further in this example, the optical axis 102-b of the optical coupler 220-b (which coincides with an optical axis of the illumination device 200-b) is centered on an exit aperture 225-b of the optical coupler 220-b and is parallel to the z-axis. Here, the tilt angle $\delta$ between the emission direction 106-b and the optical axis 102-b is $0<\delta=\theta c/2<\theta c$, where $\theta c=\text{ArcCos}(1/n)$ is a critical angle associated with a refraction index n of a transparent, solid material (e.g., glass or a transparent organic plastic, such as polycarbonate or acrylic) from which the optical coupler 220-b is fabricated. Note that FIG. 4 shows cross-sections of multiple TIR optical couplers 220-b for refractive indices n=1.3, 1.5 and 1.7.

The light source 210-b can be implemented by tilting the light source 210-a—described above in connection with FIG. 2H—by the tilt angle $\delta=\theta c/2$ around an axis orthogonal on both the optical axis 102-b and the emission direction 106-b, e.g., around the y-axis. Hence, in a sectional profile illustrated in FIG. 4, the light source 210-b is represented by segment OM that has a length of 1-unit length, where the point O is the origin of a Cartesian coordinate system. An input aperture of the optical coupler 220-b is optically coupled with the light source 210-b. In this example, a width and orientation of the input aperture matches respective width and orientation of the light source 210-b.

When used as part of the illumination device 200-b, the exit aperture 225-b of the optical coupler 220-b is optically coupled to the input end of a light guide 230-b as described above in connection with FIG. 3. In other implementations, when the optical coupler 220-b can be part of a luminaire module without light guide, similar to the luminaire module 200-h, redirected light output by the optical coupler 220-b through the exit aperture 225-b is provided to an optical extractor spaced apart from the optical coupler 220-b by a distance D (not shown in FIG. 4). In the sectional profile illustrated in FIG. 4, the exit aperture 225-b is represented by segment NP.

Additionally, for tilt angles $\delta<\theta c$, the optical coupler 220-b includes a curved side surface 224-b and a composite side surface 223-b that are shaped such the light emitted from any point of the light source 210-*b* is incident on the curved side surface 224-*a* and the composite side surface 223-*b* at angles that are at or exceed the critical angle θc. For the examples illustrated in FIG. 4, all light emitted by the light source 210-*b* is redirected by the optical coupler 220-*b* via TIR towards the exit aperture 225-*b*. The composite side surface 223-*b* includes a curved portion 224'-*b* and a flat portion 226-*b*. Here, the flat portion 226-*b* is aligned with the optical axis 102-*b*. In the sectional profile of the optical coupler 220-*b* illustrated in FIG. 4, the curved side surface 224-*b* is represented by curve MM, the curved portion 224'-*b* of the composite side surface 223-*b* is represented by curve OQ, where the point O is the origin of the Cartesian coordinate system, and the flat portion 226-*b* of the composite side surface 223-*b* is represented by segment QP parallel with the z-axis. Here, the point Q of the composite side surface 223-*b* separates the curved portion 224'-*b* from the flat portion 226-*b*.

Any point $R_1$ of the curved side surface 224-*b*—for which a segment $OR_1$ is inclined by an angle α relative to the segment OM (which in turn is tilted from the x-axis by the tilt angle $\delta=\theta c/2$)—is separated from the point O of the light source 210-*b* by a distance $OR_1(\alpha)$ given by Equation (1). In this case, the angle α satisfies $0 \le \alpha \le \theta c + \delta = 3\theta c/2$. Point N on the output aperture 225-*b* is part of the curved side surface 224-*b* and separated from the point O of the light source 210-*b* by a distance $ON=OR_1(\alpha=\theta c+\delta)=OR_1(3\theta c/2)$. Similarly, any point $R_2$ of the curved portion 224'-*b* of the composite side surface 223-*b*—for which a segment $MR_2$ is inclined by an angle θ relative to the segment MO (which in turn is tilted from the x-axis by the tilt angle $\delta=\theta c/2$)—is separated from the point M of the light source 210-*b* by a distance $MR_2(\beta)$ given by Equation (2). In this case, the angle β satisfies $0 \le \beta \le \theta c - \delta = \theta c/2$. Point Q on the curved portion 224'-*b* of the composite side surface 223-*b* is separated from the point M of the light source 210-*b* by a distance $MQ=MR_2(\beta=\theta c-\delta)=MR_2(\theta c/2)$.

Moreover, the point Q—with Cartesian coordinates ($x_Q$, $z_Q$)—also is part of the flat portion 226-*b* of the composite side surface 223-*b*. Additionally, any point $R_3$ of the flat portion 226-*b* of the composite side surface 223-*b* has an x-coordinate equal to $x_Q$—the x-coordinate of the point Q. Hence, the point P on the output aperture 225-*b* has coordinates ($x_P$, $z_P$), where $x_P=x_Q$ and $z_P=z_N$. In this case, the sectional profile of the composite side surface 223-*b* including the curved portion 224'-*b* given by equation (2)—and represented by curve OQ—and the flat portion 226-*b*—and represented by segment QP—is not the mirror inverse of the sectional profile of the curved side surface 224-*b* given by equation (1)—and represented by curve MN. The curved portion OQ 224'-*b* is a mirror inverse of only a portion of the curved portion 224-*b* with respect to 106-*b*.

The curved side surface 224-*b* and the composite side surface 223-*b* may have translational symmetry along an axis perpendicular to the sectional plane of FIG. 4, e.g., along the y-axis, (like in the luminaire modules 200, 200* or 200' illustrated in FIGS. 2A-2C.)

The above calculations can be used to determine a length (along the optical axis 102-*b*, e.g., the z-axis) of the optical coupler 220-*b* and a width (along the x-axis) of the exit aperture 225-*b*. The length of the optical coupler 220-*b* is given by a maximum distance between a point of the curved side surface 224-*b* (curve MN) and the exit aperture 225-*b* (segment NP). Additionally, the width of the exit aperture 225-*b* is equivalent to a length of segment NP. Note that in the example illustrated in FIG. 4, the length of the optical coupler 220-*b* and the width of the exit aperture 225-*b* (and, hence, a volume and mass of the optical coupler 220-*b*) increase with decreasing refractive index. For example, for n=1.5, the length of the optical coupler 220-*b* is about 2.2 unit-lengths, and the width of the exit aperture 225-*b* is about 2.2 unit-lengths.

EXAMPLES 3-5

Figure 5:
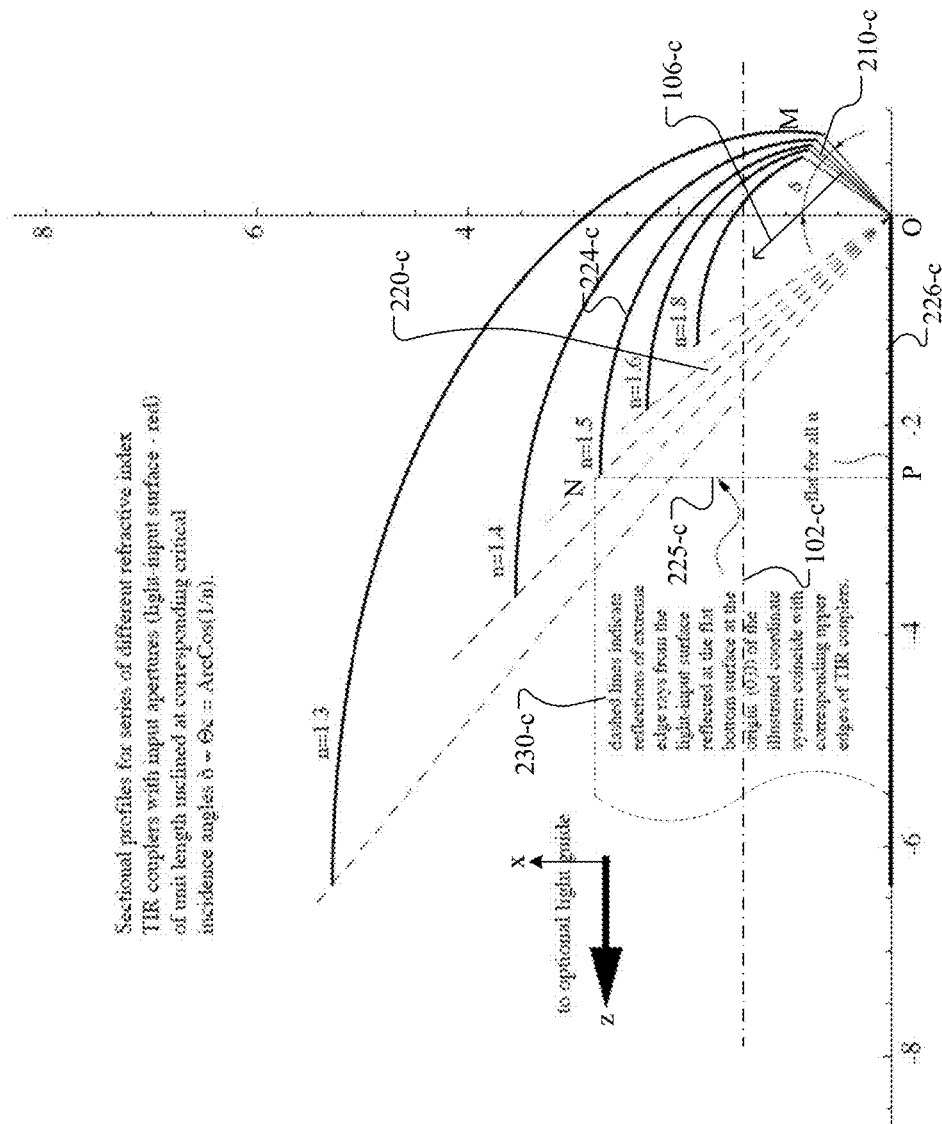
Figure 6:
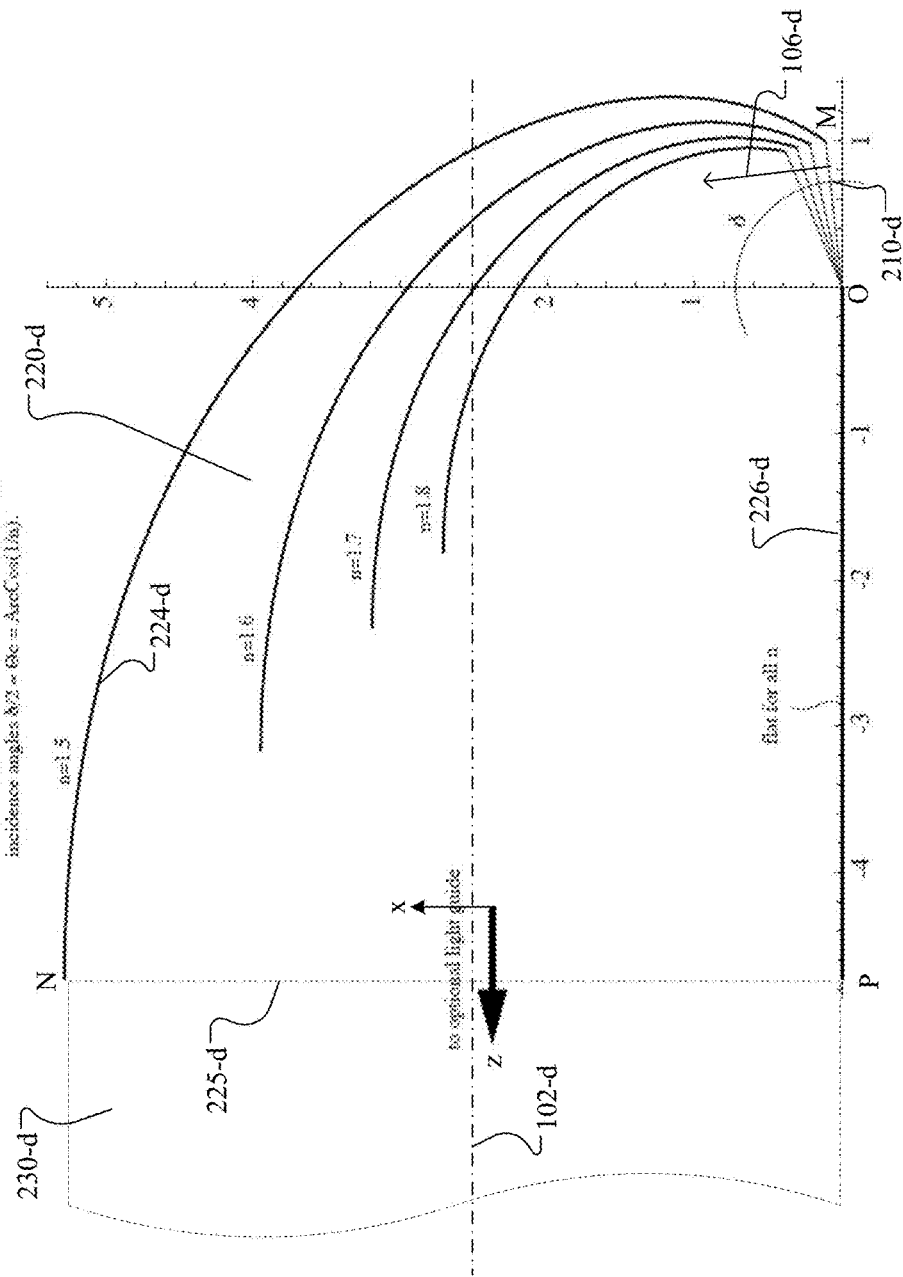
Figure 7:
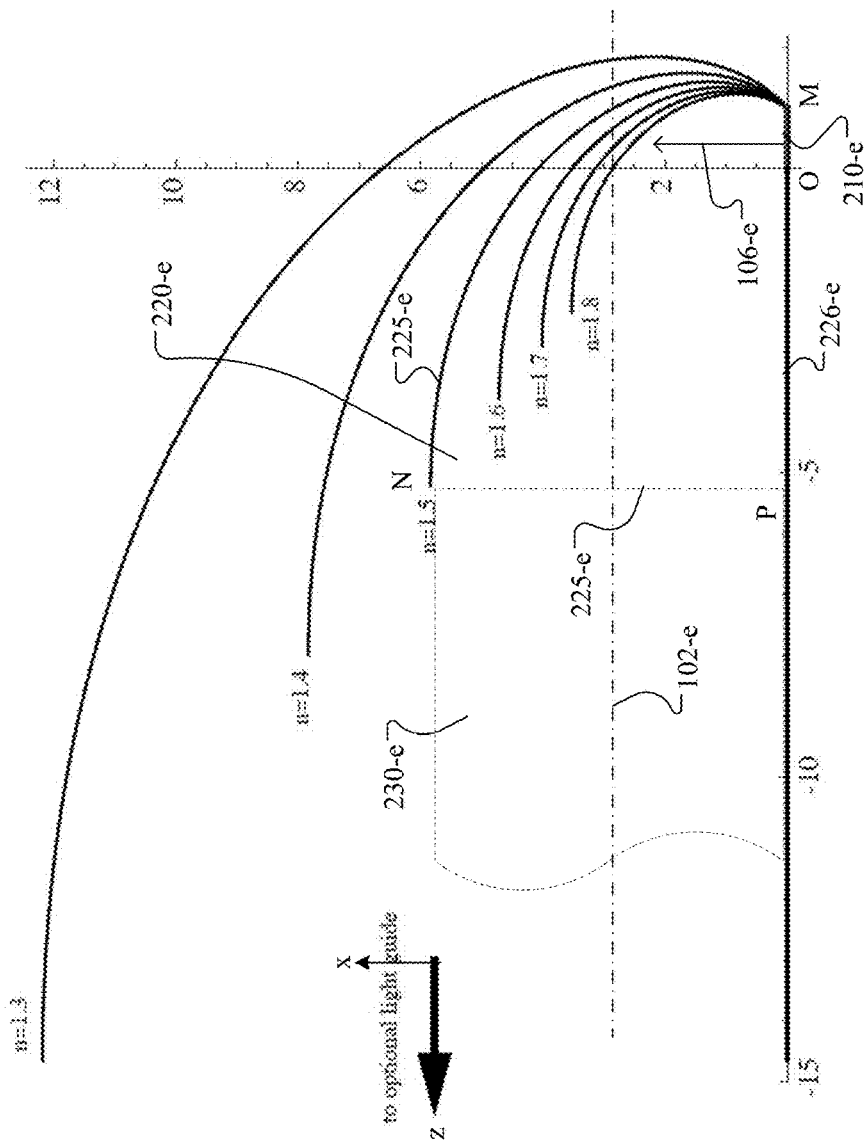

Oblique Light Injection Under an Angle Equal to or Larger than the Critical Angle FIGS. 5-7 are respective cross-sections of TIR optical couplers 220-*j* used in the illumination devices 200-*j*, where j is in the set {c, d, e}, to receive light emitted by a light source 210-*j* and to redirect the received light along an optical axis 102-*j* of the optical coupler 220-*j* using only TIR. Here, an emission direction 106-*j* of the light source 210-*j*—representing a prevalent propagation direction of the light emitted by the light source 210-*j*—forms a tilt angle δj with the optical axis 102-*j*. Further in these examples, the optical axis 102-*j* of the optical coupler 220-*j* (which coincides with an optical axis of the illumination device 200-*j*) is centered on an exit aperture 225-*j* of the optical coupler 220-*j* and is parallel to the z-axis.

For the example illustrated in FIG. 5, the tilt angle δc between the emission direction 106-*c* and the optical axis 102-*c* is $0 < \delta c = \theta c$, where $\theta c = ArcCos(1/n)$ is a critical angle associated with a refraction index n of a transparent, solid material (e.g., glass or a transparent organic plastic, such as polycarbonate or acrylic) from which the optical coupler 220-*c* is fabricated. Note that FIG. 5 shows cross-sections of multiple TIR optical couplers 220-*c* for refractive indices n=1.3, 1.4, 1.5, 1.6 and 1.8.

For the example illustrated in FIG. 6, the tilt angle δd between the emission direction 106-*d* and the optical axis 102-*d* is $\theta c < \delta d = 2\theta c$, where $\theta c = ArcCos(1/n)$ is a critical angle associated with a refraction index n of a transparent, solid material (e.g., glass or a transparent organic plastic, such as polycarbonate or acrylic) from which the optical coupler 220-*d* is fabricated. Note that FIG. 6 shows cross-sections of multiple TIR optical couplers 220-*d* for refractive indices n=1.5, 1.6, 1.7 and 1.8.

For the example illustrated in FIG. 7, the tilt angle δe between the emission direction 106-*e* and the optical axis 102-*e* is $\theta c < \delta e = 90°$, where $\theta c = ArcCos(1/n)$ is a critical angle associated with a refraction index n of a transparent, solid material (e.g., glass or a transparent organic plastic, such as polycarbonate or acrylic) from which the optical coupler 220-*e* is fabricated. Note that FIG. 7 shows cross-sections of multiple TIR optical couplers 220-*e* for refractive indices n=1.3, 1.4, 1.5, 1.6, 1.7 and 1.8.

The light source 210-*j*, where j is in the set {c, d, e}, can be implemented by tilting the light source 210-*a*—described above in connection with FIG. 2H—by the tilt angle $\delta j \ge \theta c$ around an axis orthogonal on both the optical axis 102-*j* and the emission direction 106-*j*, e.g., around the y-axis. For example, $\delta c = \theta c$ in the example illustrated in FIG. 5; $\delta d = 2\theta c$ in the example illustrated in FIG. 6; and $\delta e = 90°$ in the example illustrated in FIG. 7. Hence, in the sectional profiles illustrated in FIGS. 5-7, the light source 210-*j* is represented by segment OM that has a length of 1-unit length, where the point O is the origin of a Cartesian coordinate system. An input aperture of the optical coupler 220-*j* is optically coupled with the light source 210-*j*. In this example, a width and orientation of the input aperture matches respective width and orientation of the light source 210-*j*.

When used as part of the illumination device 200-*j*, where *j* is in the set {c, d, e}, the exit aperture 225-*j* of the optical coupler 220-*j* is optically coupled to the input end of a light guide 230-*j* as described above in connection with FIG. 3. In other implementations, when the optical coupler 220-*j* is part of a luminaire module without light guide, similar to the luminaire module 200-*h*, redirected light output by the optical coupler 220-*j* through the exit aperture 225-*j* is provided to an optical extractor spaced apart from the optical coupler 220-*j* by a distance D (not shown in FIGS. 5-7). In the sectional profiles illustrated in FIGS. 5-7, the exit apertures 225-*j* are represented by corresponding segments NP.

Additionally, for tilt angles $\delta j \geq \theta c$, where *j* is in the set {c, d, e}, the optical coupler 220-*j* includes a curved side surface 224-*j* and a flat side surface 226-*j* that are shaped such the light emitted from any point of the light source 210-*j* is incident on the curved side surface 224-*j* and the flat side surface 226-*j* at angles that exceed the critical angle $\theta c$. Here, the flat side surface 226-*j* is aligned with the optical axis 102-*j*. For the examples illustrated in FIGS. 5-7, all light emitted by the light source 210-*j* is redirected by the optical coupler 220-*j* via TIR towards the exit aperture 225-*j*. In the sectional profiles of the optical couplers 220-*j* illustrated in FIGS. 5-7, the curved side surface 224-*j* is represented by curve MN and the flat side surface 226-*j* is represented by segment OP parallel with the z-axis, where the point O is the origin of the Cartesian coordinate system.

Any point $R_1$ of the curved side surface 224-*j*, where *j* is in the set {c, d, e},—for which a segment $OR_1$ is inclined by an angle $\alpha$ relative to the segment OM (which in turn is tilted from the x-axis by the tilt angle $\delta j$)—is separated from the point O of the light source 210-*j* by a distance $OR_1(\alpha)$ given by Equation (1). In this case, the angle $\alpha$ satisfies $0 \leq \alpha \leq \theta c + \delta j$. Point N on the output aperture 225-*j* is part of the curved side surface 224-*j* and separated from the point O of the light source 210-*j* by a distance $ON = OR_1(\alpha = \theta c + \delta)$. For the example illustrated in FIG. 5, the tilt angle $\delta c = \theta c$, the angle $\alpha$ satisfies $0 \leq \alpha \leq 2\theta c$, and point N on the output aperture 225-*c* is separated from the point O of the light source 210-*c* by a distance $ON = OR_1(\alpha = 2\theta c)$. Further, for the example illustrated in FIG. 6, the tilt angle $\delta d = 2\theta c$, the angle $\alpha$ satisfies $0 \leq \alpha \leq 3\theta c$, and point N on the output aperture 225-*d* is separated from the point O of the light source 210-*d* by a distance $ON = OR_1(\alpha = 3\theta c)$. Furthermore, for the example illustrated in FIG. 7, the tilt angle $\delta e = 90°$, the angle $\alpha$ satisfies $0 \leq \alpha \leq \theta c + 90°$ and point N on the output aperture 225-*e* is separated from the point O of the light source 210-*e* by a distance $ON = OR_1(\alpha = \theta c + 90°)$.

Additionally, any point $R_3$ of the flat side surface 226-*j*, where *j* is in the set {c, d, e}, has an x-coordinate equal to $x_O = 0$—the x-coordinate of the origin point O. Hence, point P on the output aperture 225-*j* is part of the flat side surface 226-*j* and has coordinates $(x_P, z_P)$, where $x_P = 0$ and $z_P = z_N$. In this case, the sectional profile of the flat side surface 226-*j*—and represented by segment OP—is not the mirror inverse of the sectional profile of the curved side surface 224-*j* given by equation (1)—and represented by curve MN.

The curved side surface 224-*b* and the composite side surface 223-*b* may have translational symmetry along an axis perpendicular to the sectional planes shown in FIGS. 5-7, e.g., along the y-axis, (like in the luminaire modules 200, 200* or 200' illustrated in FIGS. 2A-2C.)

The above calculations can be used to determine a length (along the optical axis 102-*j*, e.g., the z-axis) of the optical coupler 220-*j* and a width (along the x-axis) of the exit aperture 225-*j*, where *j* is in the set {c, d, e}. The length of the optical coupler 220-*j* is given by a maximum distance between a point of the curved side surface 224-*j* (curve MN) and the exit aperture 225-*j* (segment NP). Additionally, the width of the exit aperture 225-*j* is equivalent to a length of segment NP. Note that in the examples illustrated in FIGS. 5-7, the length of the optical coupler 220-*j* and the width of the exit aperture 225-*j* (and, hence, a volume and mass of the optical coupler 220-*j*) increase with decreasing refractive index. For n=1.5 and a tilt angle $\delta c = \theta c$ as illustrated in FIG. 5, the length of the optical coupler 220-*c* is about 3.3 unit-lengths, and the width of the exit aperture 225-*c* is about 2.8 unit-lengths. Further, for n=1.5 and a tilt angle $\delta d = 2\theta c$ as illustrated in FIG. 6, the length of the optical coupler 220-*d* is about 5.8 unit-lengths, and the width of the exit aperture 225-*d* is about 5.2 unit-lengths. Furthermore, for n=1.5 and a tilt angle $\delta e = 90°$ as illustrated in FIG. 7, the length of the optical coupler 220-*e* is about 6.9 unit-lengths, and the width of the exit aperture 225-*e* is about 5.8 unit-lengths.

Figure 8:
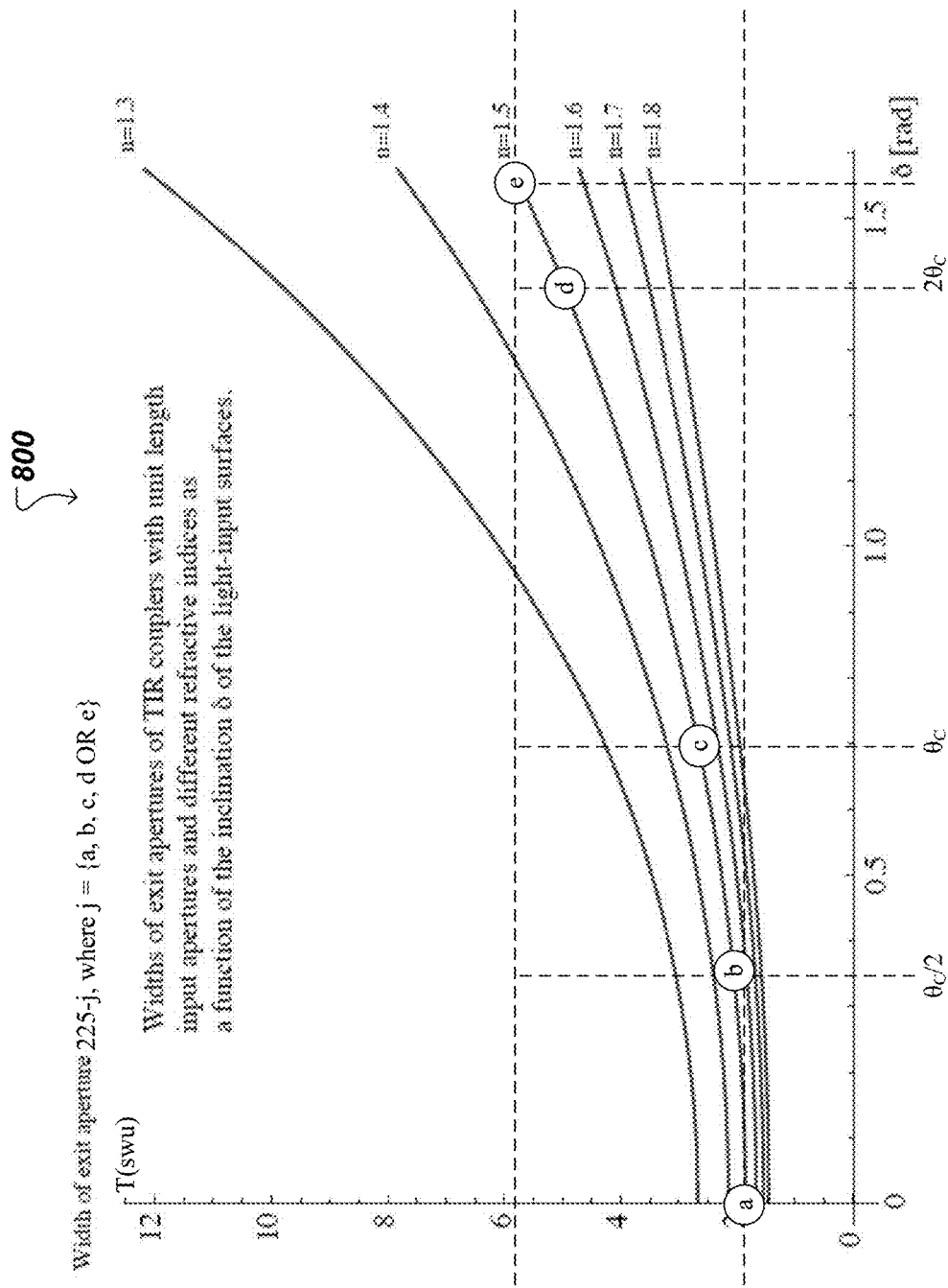

FIG. 8 shows a graph 800 that summarizes results of calculations described above in connection with FIGS. 2H, 4, 5, 6 and 7. The graph 800 represents the determined widths (along the x-axis) of the exit apertures 225-*j*, where *j* is in the set {c, d, e}, of optical couplers 220-*j* used, for example, in the illumination devices 200-*j* illustrated in FIG. 3. The width of the exit apertures are expressed in terms of units of source width (swu). When the width of the light source 210-*j* is 1 unit-length, then 1 swu=1 unit-length.

The illumination device 200-*a* (shown in FIG. 3) is configured with parallel source light injection ($\delta a = 0$) and uses an optical coupler 220-*a* (shown in FIG. 2H) that has the smallest width of the exit aperture 225-*a* from among the optical couplers 220-*j*, where *j* is in the set {a, b, c, d, e}.

The illumination device 200-*b* (shown in FIG. 3) is configured with oblique source light injection (with a shallow tilt angle $\delta b = \theta c/2 < \theta c$) and uses an optical coupler 220-*b* (shown in FIG. 4) that has a width of the exit aperture 225-*b* larger than the width of the exit aperture 225-*a* used in parallel source light injection.

The illumination device 200-*c* (shown in FIG. 3) also is configured with oblique source light injection (with a critical tilt angle $\delta c = \theta c$) and uses an optical coupler 220-*c* (shown in FIG. 5) that has a width of the exit aperture 225-*c* larger than the width of the exit aperture 225-*b* used in oblique source light injection with shallow tilt angle.

The illumination device 200-*d* (shown in FIG. 3) also is configured with oblique source light injection (with a steep tilt angle $\delta d = 2\theta c$) and uses an optical coupler 220-*d* (shown in FIG. 6) that has a width of the exit aperture 225-*d* larger than the width of the exit aperture 225-*c* used in oblique source light injection with critical tilt angle.

The illumination device 200-*e* (shown in FIG. 3) is configured with orthogonal source light injection (with a tilt angle $\delta e = 90°$) and uses an optical coupler 220-*e* (shown in FIG. 7) that has the largest width of the exit aperture 225-*e* from among the optical couplers 220-*j*, where *j* is in the set {a, b, c, d, e}.

In summary, FIG. 3 illustrates embodiments of illumination devices 200-*j*, where *j* is in the set {a, b, c, d, e}, with a coupler 220-*j* and light source 210-*j* arrangements that can provide different locations and orientations for the LEEs of the light source. Such different arrangements may be exploited for thermal purposes, direct contact coupling, resilience to placement tolerances between LEEs and coupler 220-*j*/light guide 230-*j* and/or other aspects, for example. Depending on the embodiment, the LEEs of the light source 210-*j* may be placed on a substrate or directly on the coupler 220-*j*, or the light guide 230-*j*, for example. The coupler 220-*j* and the light guide 230-*j* can be integrally formed and as such considered one component which is referred to herein as coupler or light guide as the case may be. An emission direction 106-*j* of the light source 210-*j* can be oriented parallel (like in FIGS. 2H and 3), perpendicular (like in FIGS. 3 and 7) to the optical axis 102-*j* of the optical coupler 220-*j* or at an oblique angle (like in FIGS. 3-6.) To achieve an oblique angle, a corner of the optical coupler 220-*j*, where j is in the set {b, c, d, e}, or the light guide 230-*j* may have a beveled flat edge for abutting flat LEEs or an edge with suitable indentations for receiving packaged LEEs with dome lenses, for example. An immersion substance such as silicone or other curable or non-curable immersion substance may be applied to reduce air gaps between LEEs and the coupler 220-*j*/light guide 230-*j*.

The substrate on which the LEEs are disposed to form a light source 210-*j* can be oriented substantially orthogonal (like in FIGS. 3 and 7, where j=e), oblique (like in FIGS. 3-6, where j is in the set {b, c, d}) or substantially co-planar (like in FIGS. 2H and 3, where j=a) with side surfaces of the light guide 230-*j*, as a normal to the substrate determines the LEE's dominant direction of emission. A coupler 220-*j* can be created with either a solid cross section or a hollow metallic reflector cross section that can intercept the rays of light from the LEEs of the light source 210-*j* and introduce them into the elongated light guide 230-*j* such that their angular range at the junction between the coupler 220-*j* and the light guide 230-*j* is such that substantially all of the light will propagate through the light guide 230-*j* via total internal reflection until it reaches the extractor 240-*j*. A hollow coupler may have a shape different from a solid coupler 220-*j*. The efficiency of the disclosed technologies relies on the relative size of the light source 210-*j* and the dimensions of the coupler 220-*j*. As LEDs and other solid state LEEs, such as VCSELs (Vertical Cavity Surface Emitting Lasers) continue to decrease in size and increase in surface luminance, these types of coupling methodologies become increasingly practical since the relative sizes of the coupler 220-*j* and the light guide 230-*j* and extractor 240-*j* combinations can continue to shrink in size and use of materials for increased economic advantage.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An optical coupler comprising:
   an input aperture disposed within a first plane;
   an exit aperture disposed within a second plane, the second plane intersecting the first plane at an acute tilt angle; and
   a first side surface and a second side surface extending between the input aperture and the exit aperture, the first and second side surfaces configured to direct incident light from the input aperture to the exit aperture via total internal reflection (TIR),
   wherein, in a cross-section of the optical coupler that is orthogonal to the first plane and the second plane,
      the first side surface is shaped as a first logarithmic spiral which depends on the acute tilt angle and a critical TIR angle, and
      at least a portion of the second side surface adjacent the exit aperture is flat; and
   wherein the cross-section of the optical coupler varies along an axis parallel to the first plane and the second plane.

2. An illumination device comprising:
   a light source configured to emit, during operation, light in an emission angular range, wherein a prevalent direction of propagation of the emitted light in the emission angular range is different from a direction of an optical axis of the illumination device; and
   the optical coupler of claim 1, the exit aperture of the optical coupler being centered on the optical axis of the illumination device,
   wherein the optical coupler receives, through the input aperture from the light source, the light emitted in the emission angular range, and redirects the received light to the exit aperture, and
   wherein the redirected light is issued through the exit aperture in a redirected angular range.

3. The illumination device of claim 2, wherein a prevalent direction of propagation of the redirected light in the redirected angular range is along the optical axis of the illumination device.

4. The illumination device of claim 2, wherein the redirected angular range has a smaller divergence than the emission angular range.

5. The illumination device of claim 2, wherein the light source comprises an LED die.

6. The illumination device of claim 2, wherein the light source emits white light.

7. The illumination device of claim 2, wherein the light source and the input aperture of the optical coupler are immersion coupled.

8. The illumination device of claim 7, wherein the light source comprises a phosphor layer and the phosphor layer is immersion coupled with the input aperture of the optical coupler.

9. The illumination device of claim 2, further comprising
   a light guide comprising a receiving end and an opposing end that are disposed along the optical axis of the illumination device, the receiving end arranged to receive the light issued by the optical coupler, the light guide configured to guide the light received at the receiving end in a forward direction toward the opposing end of the light guide; and
   an optical extractor located at the opposing end and configured to output the guided light into an ambient environment as output light in backward directions.

10. The illumination device of claim 9, wherein a numerical aperture of the light guide is such that the light received from the optical coupler in the redirected angular range can be guided by the light guide via TIR.

11. The illumination device of claim 9, wherein the optical extractor has at least one redirecting surface, the at least one redirecting surface of the optical extractor being arranged and shaped to reflect at least a portion of the guided light in a direction that has a component orthogonal to the forward direction.

12. The illumination device of claim 9, wherein the optical extractor has a first redirecting surface arranged and shaped to reflect at least a portion of the guided light in a first direction that has a component orthogonal to the forward direction, and a second redirecting surface arranged and shaped to reflect at least a portion of the guided light in a second direction that has a component orthogonal to the forward direction and antiparallel to the orthogonal component of the first direction.

13. The illumination device of claim 2, further comprising
an optical extractor disposed on the optical axis of the illumination device and spaced apart from the exit aperture of the optical coupler by a separation distance,
wherein a combination of (i) the separation distance and (ii) a numerical aperture of the optical extractor is such that all the light issued by the optical coupler impinges on the optical extractor, and
wherein the optical extractor is configured to output into an ambient environment the light that impinges thereon as output light in backward directions opposing a prevalent direction of propagation of the light issued by the optical coupler.

14. The illumination device of claim 13, wherein the optical extractor has at least one redirecting surface, the at least one redirecting surface of the optical extractor being arranged and shaped to reflect at least a portion of the light that impinges thereon in a backward direction that has a component orthogonal to the prevalent direction of propagation of the light issued by the optical coupler.

15. The illumination device of claim 13, wherein the optical extractor has a first redirecting surface arranged and shaped to reflect at least a portion of the light that impinges thereon in a first direction that has a component orthogonal to the prevalent direction of propagation of the light issued by the optical coupler, and a second redirecting surface arranged and shaped to reflect at least a portion of the light that impinges thereon in a second direction that has a component orthogonal to the prevalent direction of propagation of the light issued by the optical coupler and antiparallel to the orthogonal component of the first direction.

16. The optical coupler of claim 1, wherein
the acute tilt angle is less than the critical TIR angle, and
in the cross-section of the optical coupler, the second side surface comprises a curved portion between the input aperture and the flat portion, the curved portion being a second logarithmic spiral which depends on the acute tilt angle, the critical TIR angle and a dimension of the input aperture, such that the second side surface is continuous at an intersection of the curved portion with the flat portion.

17. The optical coupler of claim 1, wherein
the acute tilt angle is equal to or larger than the critical TIR angle, and
the flat portion of the second side extends from the input aperture to the exit aperture.

18. The optical coupler of claim 1, wherein the first side surface or the second side surface are curved along the axis parallel to the first plane and the second plane.

19. The optical coupler of claim 1 comprising transparent material.

20. An illumination device comprising:
the optical coupler of claim 1; and
multiple light-emitting elements (LEEs) optically coupled to the input aperture of the optical coupler and arranged along the axis parallel to the first plane and the second plane of the optical coupler,
wherein the multiple LEEs emit, during operation of the illumination device, light having a discrete light-emission profile along the axis parallel to the first plane and the second plane.

* * * * *